INVENTORS
PAUL B. GREENE
ALBERT B. MEWHINNEY
FRANCIS E. WIRTZ
BY D. C. Staley
ATTORNEY INVENTORS
PAUL B. GREENE
BY ALBERT B. MEWHINNEY
FRANCIS E. WIRTZ
D. C. Staley
ATTORNEY

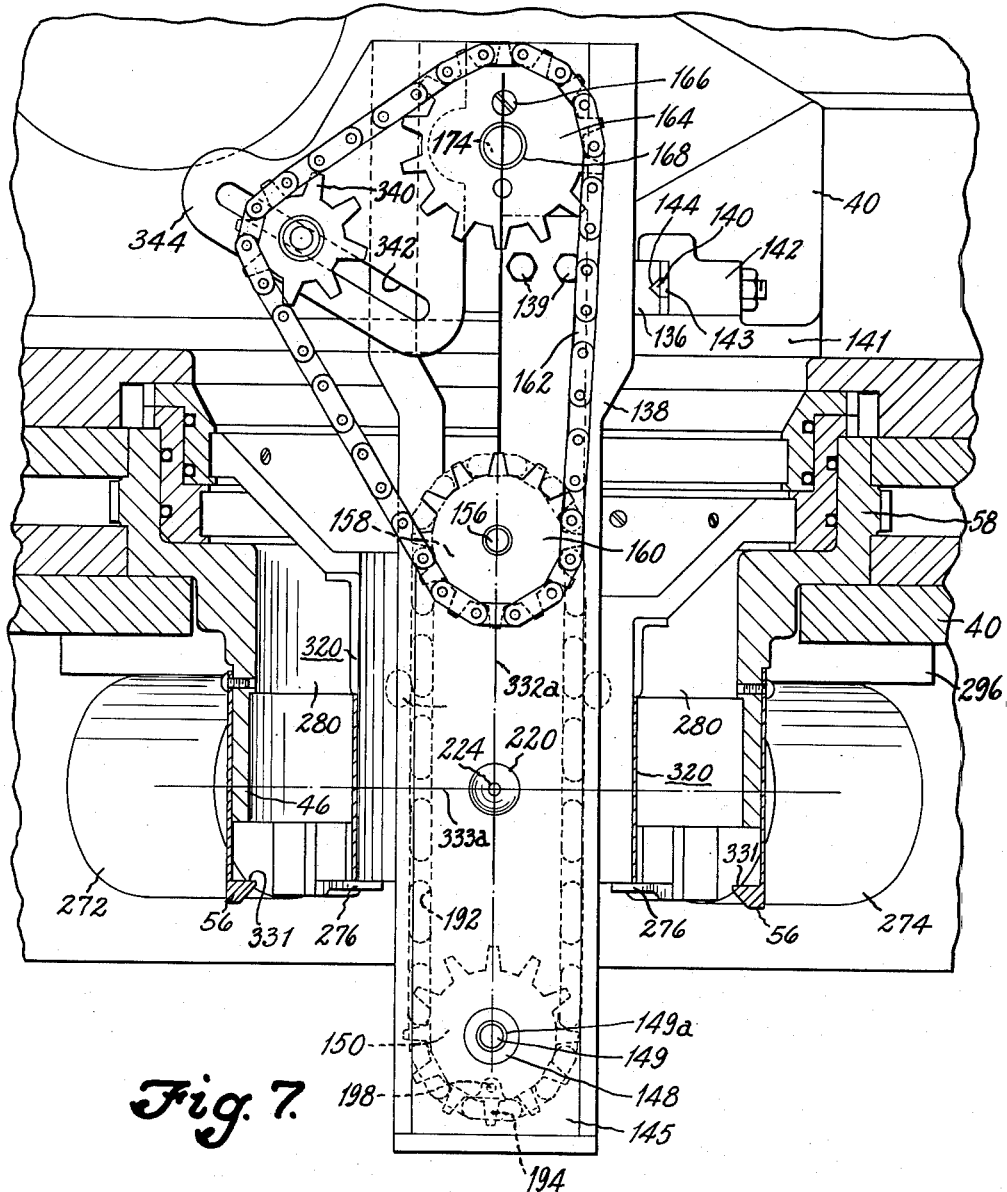

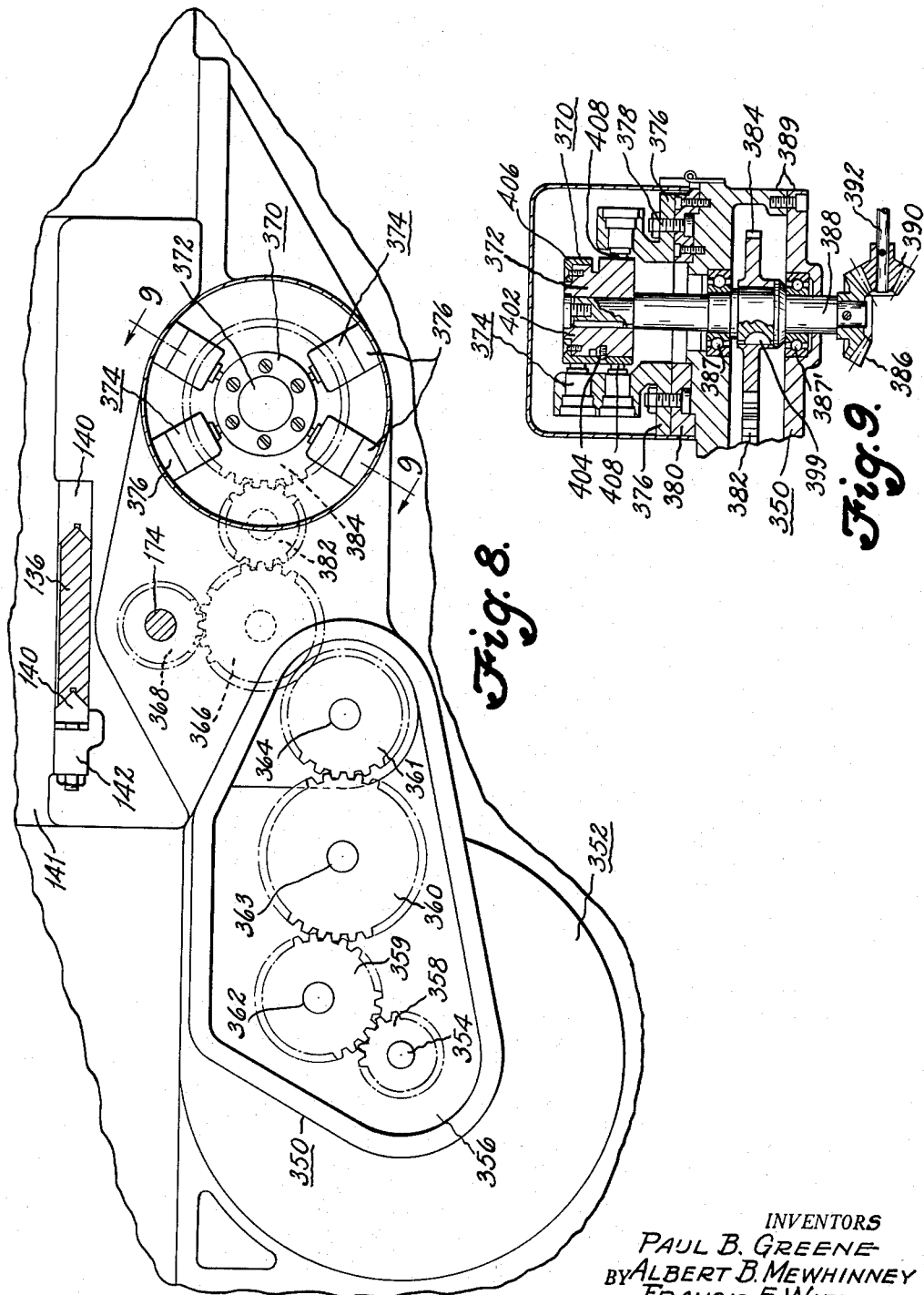

June 13, 1961 P. B. GREENE ET AL 2,988,291
STATOR COIL WINDING MACHINE
Filed Oct. 28, 1957 11 Sheets-Sheet 9

INVENTORS
PAUL B. GREENE
ALBERT B. MEWHINNEY
BY FRANCIS E. WIRTZ
D. C. Staley
ATTORNEY INVENTORS
PAUL B. GREENE
BY ALBERT B. MEWHINNEY
FRANCIS E. WIRTZ
D. C. Staley
ATTORNEY

INVENTORS
PAUL B. GREENE
ALBERT B. MEWHINNEY
BY FRANCIS E. WIRTZ

D. C. Staley
ATTORNEY ved June 13, 1961

2,988,291
STATOR COIL WINDING MACHINE
Paul B. Greene, Albert B. Mewhinney, and Francis E. Wirtz, Dayton, Ohio, assignors to General Motors Corporation, Detroit, Mich., a corporation of Delaware
Filed Oct. 28, 1957, Ser. No. 692,847
18 Claims. (Cl. 242—1.1)

This invention relates to the manufacture of dynamoelectric machines or any other device having an annular structure requiring the placing of wiring as coils into slots formed therein, and particularly, to a stator coil winding machine for winding coils in a multiple pole pattern.

An object of the invention is to provide automatic and continuously progressive winding of coils with a slotted member using an apparatus adapted to operate sequentially in guiding and placing wiring in various patterns of location of coils with respect to slots.

Another object is to provide apparatus for winding wiring as coils into a slotted annular structure using a winding head member arranged to be movable into operative relationship with a plurality of slots through a cantilever support including driving means remaining connected to a chain moved wire-guiding eyelet even during indexing to various pairs of slots.

Another object is to provide a winding apparatus having a head portion movable to coil winding relationship with slots of an independently supported annular member using a continuous driving connection and position indexing means controlling movement and stopping of a wire-guiding eyelet through a clockwise and counterclockwise looping pattern assuring taut winding of constant pitch coils without tearing or pulling the wire out of any slot into which it has been placed.

Another object is to provide a coil winding machine having an operatively connected winding head movable transversely to a plane of movement of a wire-placing eyelet about guide means attached to the head and cooperable with a pair of slots of a separately supported annular member to effect winding of constant pitch coils thereby.

Another object is to provide coil winding apparatus having a winding head transversely movable relative to the axis of an independently-supported slotted annular member whereby wiring is placed as coils in progressive pairs of slots in a pattern governed by loop-counting-controlled indexing means under a substantially uniform tensioning of the wire fed continuously through a freely rotatable snorkel member connecting the head with a wire-guiding shoe means about which an eyelet chain driven about the head feeds wire as coils into the slots.

Another object is to provide a stator coil winding machine having a winding head transversely movable relative to the axis of an independently-supported slotted annular member into multiple wire placing positions with the annular member which is rotatable relatively to the winding head by indexing means to form coils wound flat along transverse ends between slots between wire-guiding shoe forms attached to the head and separately actuated coil supporting linkage.

Another object is to provide a stator coil winding machine adapted to wind multiple coils into slots of an annular member at various depths in the slots using cam-actuated clam shells and pole hooking devices to maintain completed wire coils in place in the slots.

Another object is to provide multiple-shaped wire guiding shoes with a stator coil winding machine adapted to be cooperable with an articulated linkage forming flat transverse coil loops between angularly separated slots of an annular member at various depth locations in the slots for multiple-phase windings of a dynamoelectric machine.

Another object is to provide a stator coil winding machine providing a winding head movable relative to an independently supported slotted member for winding wire in coil loops in the slots and including finger mechanism movable into operative engagement with and protecting insulating means projecting from slots into which the wire is wound from damage during winding operation of the machine.

Further objects and advantages of the present invention will be apparent from the following description, reference being had to the accompanying drawings, wherein a preferred embodiment of the present invention is clearly shown.

In the drawings:

FIG. 7 is a fragmentary cross-sectioned view taken along line 7—7 of FIG. 5.

FIG. 8 is a partially sectioned fragmentary view taken along line 8—8 of FIG. 2.

FIG. 9 is a sectioned view taken along line 9—9 of FIG. 8.

Figure 17:
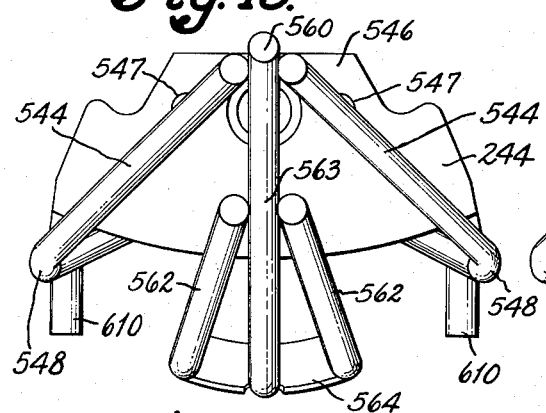
FIGURES 17 and 18 are end views of another set of shoe segments similar to those of FIGURES 13 to 16 but adapted to place wire at a third depth in slots to form coils with an annular member.
Figure 18:
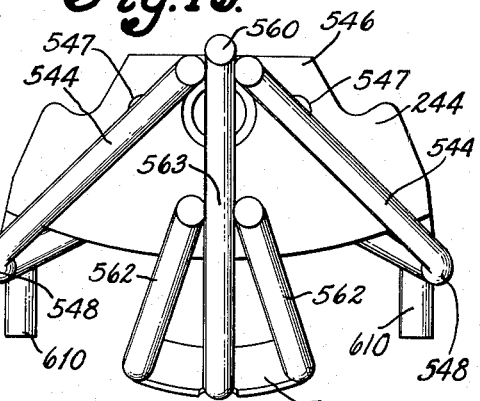
Figure 20:
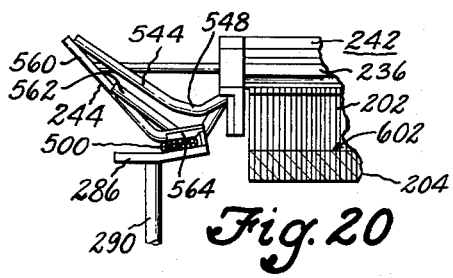
FIG. 20 through FIG. 28 are fragmentary side views illustrating placement of electrical winding coils for a three-phase winding using shoe segments illustrated in FIGURES 13–18 inclusive.
Figure 21:
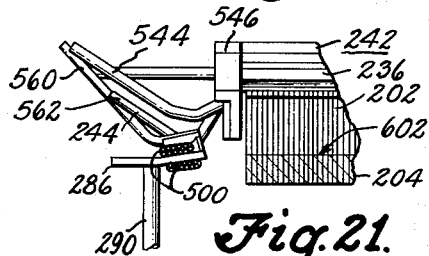
Figure 22:
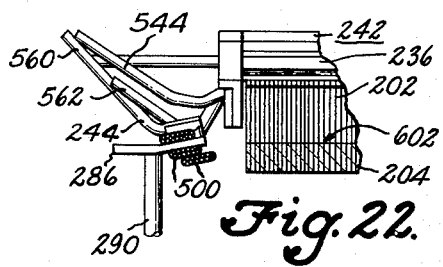

FIGURES 20, 21, and 22 illustrate the function of a coil hooker in the present invention cooperating with shoe segments of FIGURES 17 and 18 to place coils relative to radial slots of a laminated stator to form a first group of coils comprising a single phase winding at the deepest or bottom position relative to slots in the stator.

Figure 15:
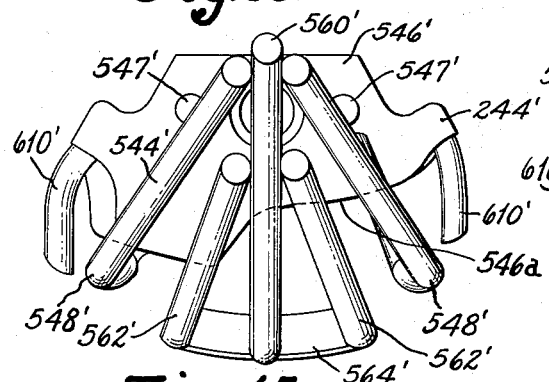
FIGURES 15 and 16 are end views of shoe segments similar to those of FIGURES 13 and 14 but adapted to place wire at a second depth in slots to form coils with an annular member.
Figure 16:
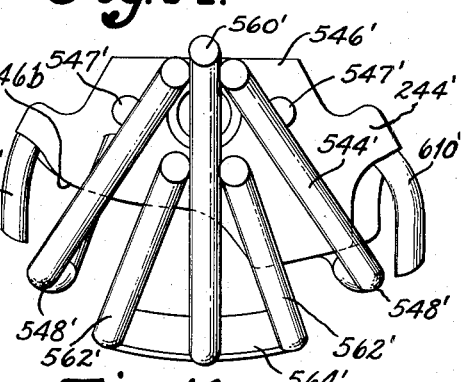
Figure 25:
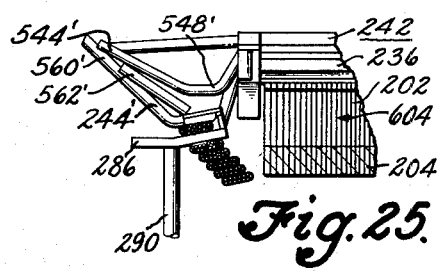
Figure 23:
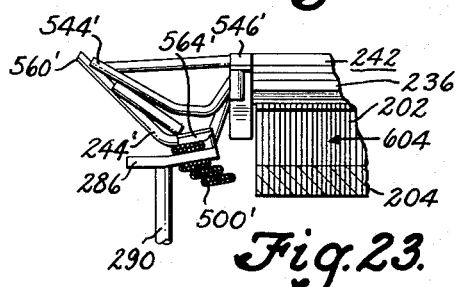
Figure 24:
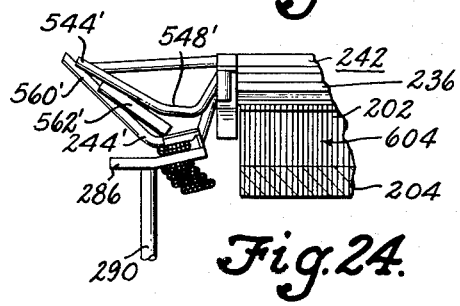

FIGURES 23, 24, and 25 illustrate use of a coil hooker wtih shoe segments of FIGURES 15 and 16 for locating windings relative to an intermediate depth in the slots for a second phase winding of a dynamoelectric machine stator.

Figure 13:
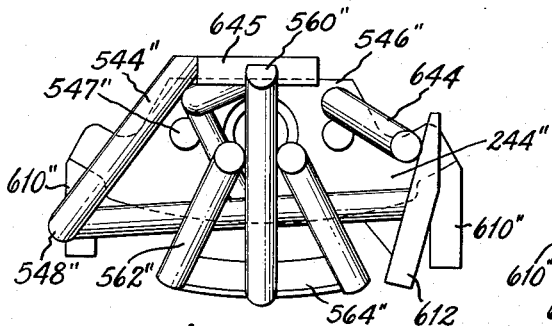
FIGURES 13 and 14 are end views of wire guiding shoe segments for use with the present invention to place wire at one depth in slots of an annular member to form flat transverse coil loops between angularly separated slots.
Figure 14:
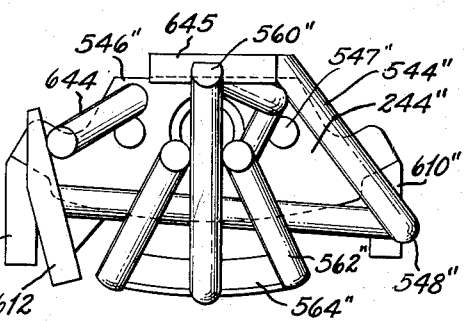
Figure 26:
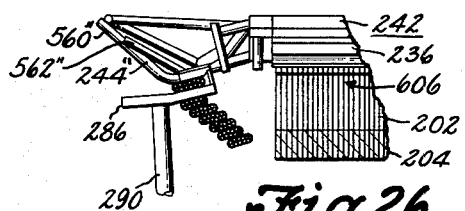
Figure 27:
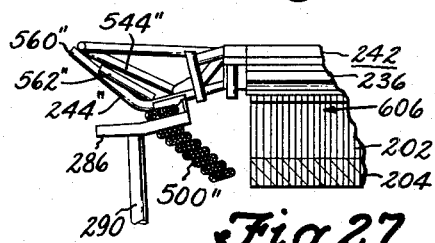
Figure 28:
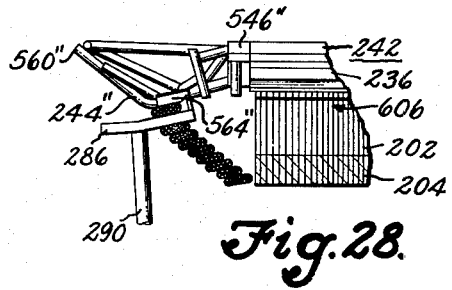

FIGURES 26, 27, and 28 illustrate use of shoe segments of FIGURES 13 and 14 in cooperation of a coil hooker for placing a third phase winding of a dynamoelectric machine into stator lamination slots such that the windings are placed near the top of the slots using shoes providing a more shallow placement of wire than with the shoe segments of FIGURES 17 and 18, or FIGURES 15 and 16, respectively.

Figure 1:
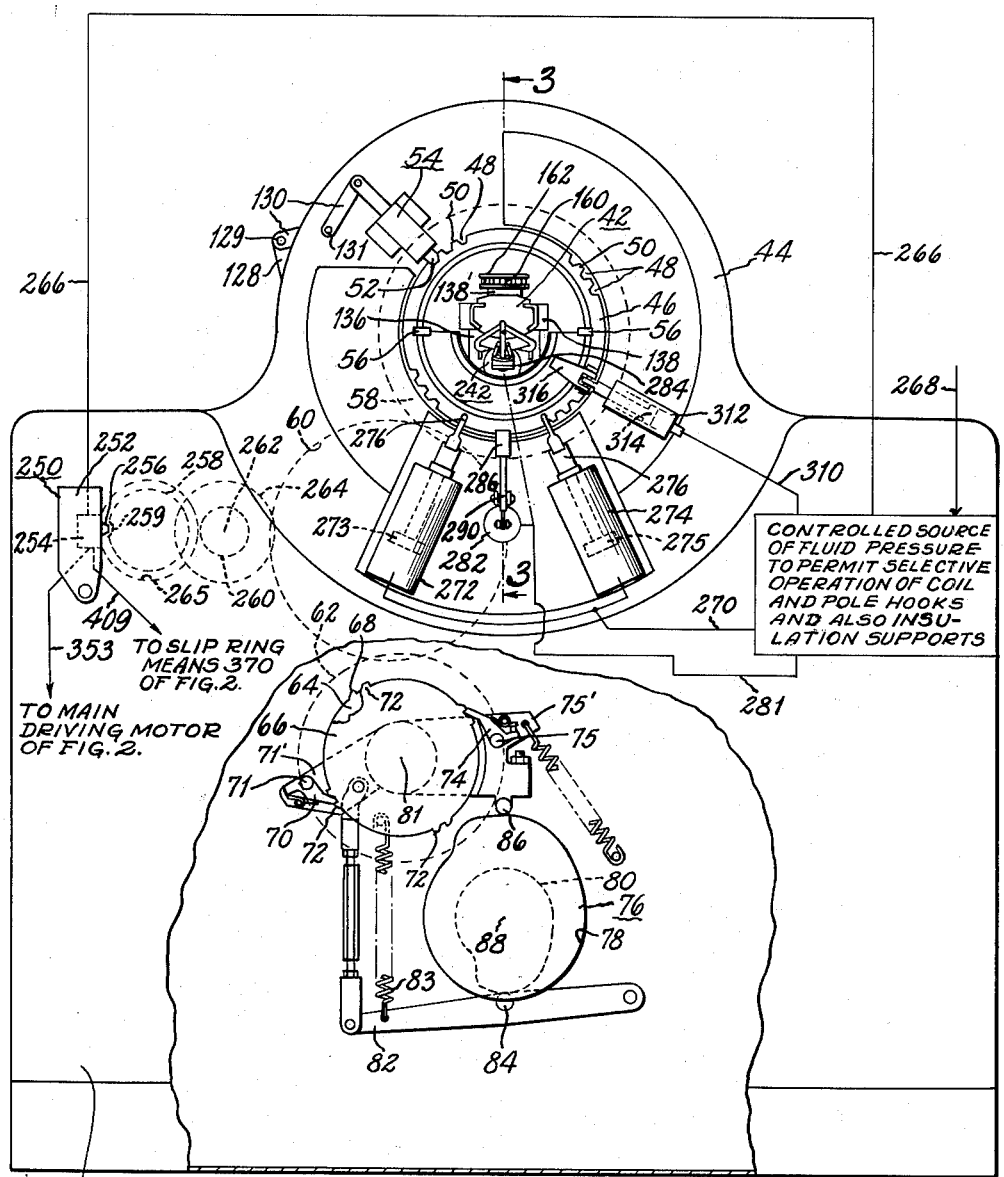
FIG. 1 is a front elevational view of the stator coil winding machine of the present invention.

In FIG. 1 there is illustrated a front elevational view of a stator coil winding machine of the present invention including a base or support portion generally indicated by numeral 40 as well as a winding head portion generally indicated by numeral 42. The base 40 includes a portion 44 which rotatably supports a stator locating ring 46 having quadrant portions each provided with peripheral recesses 48 forming teeth 50 engageable by a shotpin or plunger 52 of an index lock cylinder means generally indicated by numeral 54. The stator locating ring 46 is a hollow cylindrical member adapted to support a stator lamination assembly formed of a plurality of sheet metal laminations having radially inwardly extending slots aligned relative to each other. A pair of keys or clamps 56 are provided with the stator locating ring for positively locking the ring and stator lamination assembly into engagement with each other. Thus depending upon the position of the ring 46 relative to winding head portion 42, a stator lamination assembly will be positioned having slots in rotatably indexed locations relative to the winding head portion.

Stator locating ring 46 has a ring gear portion 58 which meshes with an indexing gear 60 which is in turn driven by a gear 62 connected to rotate with a pair of spline discs 64 and 66, respectively. As seen in FIG. 1, spline disc 64 is located behind disc 66 and is visible only at a break-a-way portion in the view of FIG. 1. Rear disc 64 has four external teeth 68 spaced equidistantly from each other and extending radially outwardly to be capable of individually engaging an indexing pawl 70 that controls indexing position movement from one quadrant to a successive quadrant for locating placement of windings in stator lamination slots about the inner periphery of a stator lamination assembly placed inside the ring 46. Similarly the front disc 66 carries a plurality of teeth 72 located in quadrature relative to each other and displaced angularly relative to teeth 68 by a proportional amount of degrees determined by adjacent location of recesses 48 on locating ring 46 forming groups of teeth 50 in each quadrant of the locating ring. Each tooth 72 of front disc 66 is engageable by a pawl 74 governing indexing position movement for a short angular distance from one recess 48 to an adjacent recess 48 of locating ring 46 shifting a stator lamination assembly with radially inwardly extending slots a short angular distance relative to winding head portion 42 for placement of conductors into the stator lamination assembly slots as will be described in further detail below for the coil winding machine embodying the present invention.

Engagement and disengagement of pawls 70 and 74 with teeth 68 and 72, respectively, is governed by a pawl-moving cam means generally indicated by numeral 76 including a short indexing cam 78 and a long indexing cam 80. Each pawl 70 and 74 is pivotable about a pin 71 and 75, respectively. Each pin is supported by a bracket means 71' and 85', respectively, pivotable about an axis 81 of rotation in common with the axis of rotation of gear 62 and discs 64 and 66. Bracket 71' is connected through a spring biased bell crank means 82 into camming engagement of a pin or roller 84 with a peripheral cam surface of long indexing cam 80. A spring 83 is disposed between base 40 and bell crank 82 urging positive engagement of pin or roller 84 with the cam surface of long indexing cam 80 thereby effecting a following action of bracket 71' relative to movement of the cam surface of long indexing cam 80 to effect shifting movement of pawl 70 angularly about axis 81 causing rotative movement of disc 64 and gear 62 meshing with gear 60 and the geared portion of locating ring 46 to effect angular shifting movement of a stator lamination assembly supported by the ring 46 an angular distance equivalent to moving from the last recess 48 of one quadrant to the first recess of a following quadrant.

A pin or roller 86 carried by bracket 75' engages and follows a peripheral cam surface of short indexing movement cam 78 to cause movement of disc 66 through engagement of pawl 74 against individual teeth 72 effecting a short indexing rotating action transmitted by gear 62 through gear 60 to ring 46 moving a stator lamination an angular distance equal to the angular distance between center lines of recesses 48 adjacent each other in each quadrant as shown on ring 46 by the view in FIG. 1. Pawl 70 does not engage any tooth 68 when pawl 74 engages any tooth 72 and vice versa. Pawl 70 can never engage any tooth 72 and pawl 74 can never engage any tooth 68. The front disc 66 is operated with short indexing and rear disc 64 is operated with long indexing. The cams 78 and 80 are rotatable about an axis 88 which is significant in further operational features of the stator winding machine of the present invention more easily understandable by referring to the drawing in FIG. 2.

Figure 2:
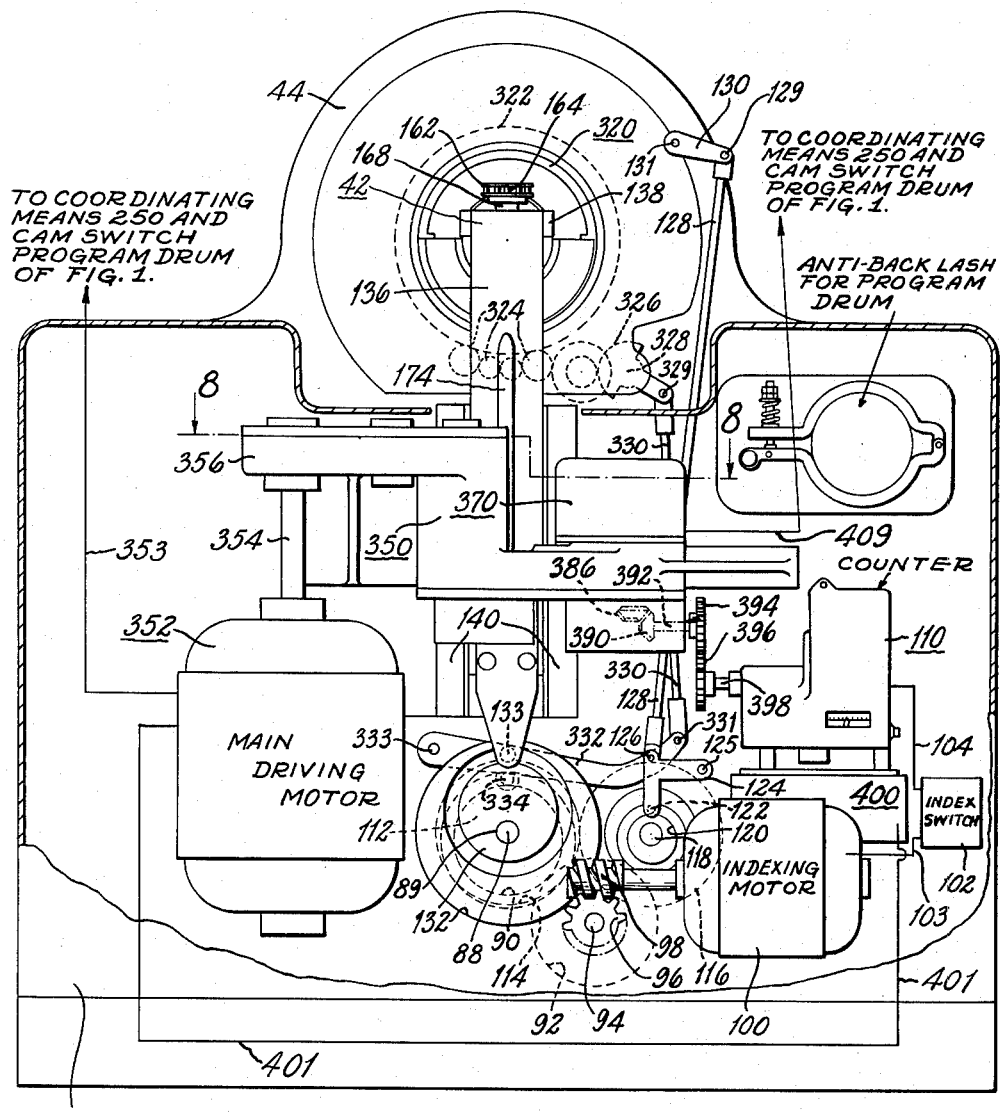
FIG. 2 is a rear elevational view of the machine in FIG. 1.

FIG. 2 is a rear elevational view of the machine in FIG. 1 and the axis 88 for long and short indexing cams 78 and 80 is shown to coincide with a shaft 89 which is suitably journaled in an upwardly extending central wall of base 40. FIG. 2 represents a view to the rear of this central wall whereas FIG. 1 showed the mechanism on the opposite side of this central wall of the machine of the present invention. Shaft 89 carries a gear 90 which meshes with a drive gear 92 carried by a shaft 94 rotatable through pinion 96 on the shaft 94 and driven by a worm gear 98 attached to a shaft of a driving motor for the indexing means generally indicated by numeral 100. Indexing motor 100 is energized in accordance with an indexing control or switch 102 shown schematically connected by a line 103 to motor 100 as well as a schematic connection by line 104 to a counter device generally indicated by numeral 110. The counter device functions with a winding mechanism and drive gears thereof described in further detail below for recording any predetermined number of turns of winding placed by the machine during its operation in stator lamination slots serving then to effect movement of electrical switches through connection 104 to energize driving motor 100 of the indexing means. Thus far the function of the indexing means has been described only as directed to shifting movement of stator locating ring 46 to rotate a stator lamination assembly angularly for cooperation with winding head portion 42 described by FIG. 1.

The indexing means functions to control various other operations because additional mechanism is mechanically cooperable with the driving motor 100. During functioning of driving motor 100, drive gear 92 rotates gear 90 and shaft 89 simultaneously to rotate a cam 112 on shaft 89 for operation of clam shells actuated through mechanism cooperable between cam 112 and arcuate clam shell members serving to retain windings placed in lamination slots in place during indexing or shifting movement of the stator lamination assembly on the machine. The clam shells and mechanism connected therewith will be described more fully later.

Shaft 89 also carries a gear 114 that meshes with a driven sprocket 116 carried on a shaft 118 suitably journaled relative to base 40 and attached to a shot pin cam 120 having an outer peripheral surface engaged by a roller 122 carried by a link 124 pivoted about pin 125 and transmitting cam motion through a pin 126 to a connecting rod 128 which in turn is tied through pin 129 to a bell crank means 130 journaled to pivot on a pin 131 for transmitting reciprocable movement or force to shot pin 52 of the index lock cylinder means 54 shown in FIG. 1. Pin 131 is journaled relative to base 40 and provides a pivot for transmission of movement to shot pin 52 during operation of the indexing driving motor 100 causing rotation of shot pin cam 120 effecting retraction of the shot pin 52 from a recess 48 of locating ring 46 to a position free of engagement with teeth 50 permitting either long or short indexing movement of locating ring 46 with the stator lamination assembly attachable thereto in accordance with driving movement transmitted through gears 58 and 60 described with FIG. 1. Cam 120 functions to relocate shot pin 52 in another recess 48 after completion of either a long or short indexing movement effected by indexing cams 78 or 80. As noted before, the shot pin 52 cooperating with recesses 48 locks the stator locating ring 46 into position relative to winding head portion 42 for placement of a conductor wire winding into armature slots.

Energization of the indexing means driving motor 100 also effects rotation of a winding head cam 132 on shaft 89 for effecting reciprocable movement of winding head portion 42 by means of a roller 133 on head portion 42 engageable against a peripheral cam surface of cam 132. The off center relationship of cam 132 relative to axis 88 of shaft 89 determines a vertical shifting movement of the winding head portion 42 into engagement with or free of engagement with a stator lamination assembly which may be attached to the stator locating ring 46 through keys 56 described with FIG. 1. Thus during indexing movement of ring 46 and operation of indexing motor 100, the winding head portion 42 is moved by cams to be free of engagement with any windings or slots located with the stator lamination assembly into which conductors are being placed by the subject apparatus.

Figure 3:
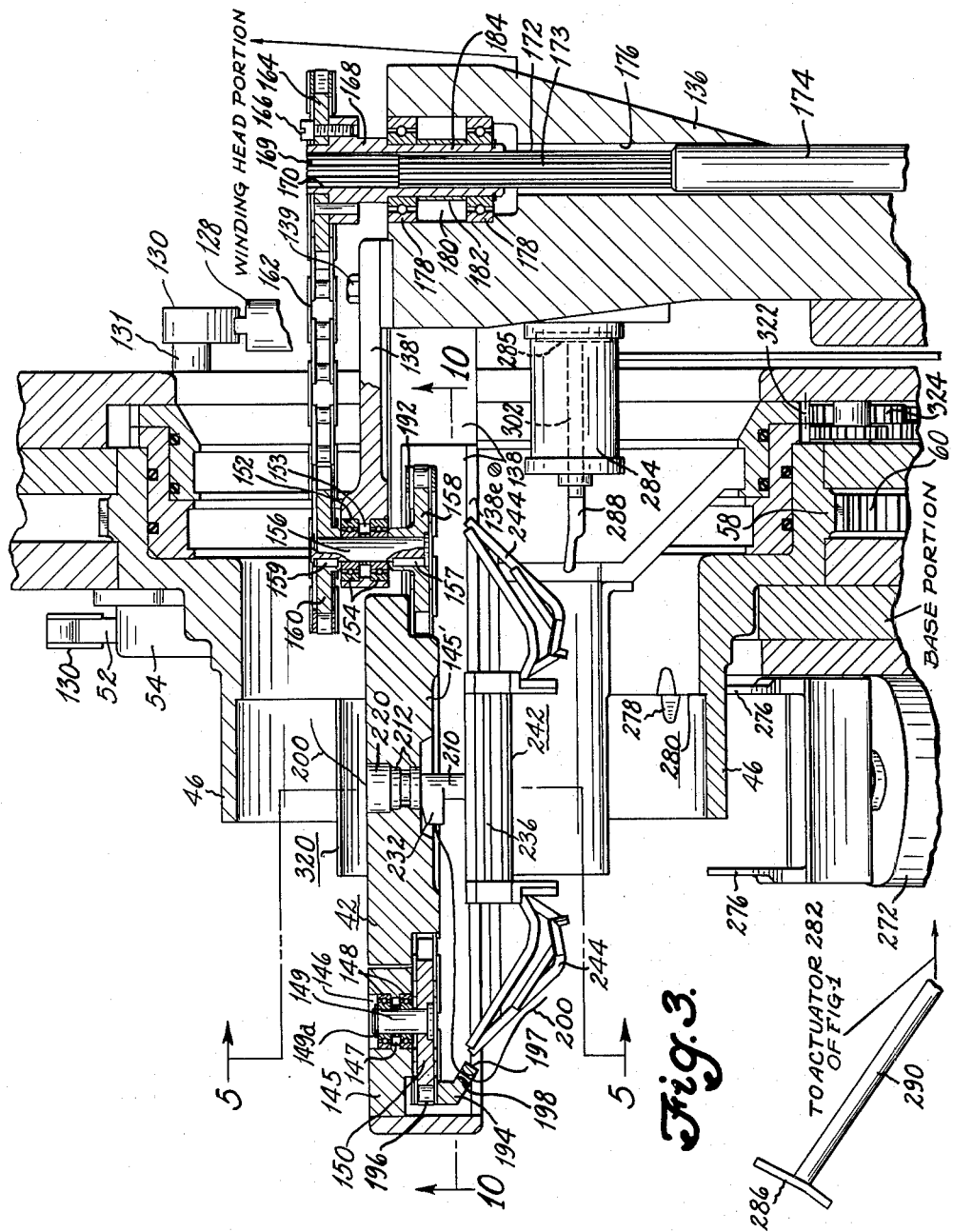
FIG. 3 is a fragmentary cross-sectional view taken along line 3—3 of FIG. 1 to show winding head structure in the present invention in a position away from engagement with a slotted stator structure.

FIG. 3 is a fragmentary cross sectional view taken along line 3—3 of FIG. 1 to show winding head structure in the present invention in a position away from engagement with a slotted stator structure. FIG. 3 shows winding head portion 42 including both a vertically movable leg or arm segment 136 and a leg or arm segment 138 extending angularly or transversely from arm segment 136 providing an elbow-shaped head portion means or winding head portion 42. As seen in FIGURES 3 and 7, suitable fastening means such as bolts 139 connect arm segment 136 with arm segment 138. The vertically movable arm segment 136 is slidably supported by a dovetail means, generally indicated by numeral 140 in FIGURES 2, 7 and 8, for reciprocating movement vertically relative to an intermediate upwardly extending wall 141 of base 40 as visible in FIG. 7. The wall 141 carries a bracket 142 through which there extends an adjustable tongue or wedge shaped member 143 cooperable with a groove or V-shaped recess 144 of vertical arm segment 136 cooperating with the arm 138 as can be best visualized in the fragmentary cross sectioned view taken along line 7—7 of FIG. 5 to provide the plan view of FIG. 7. It is to be understood that guide means such as 140 are provided laterally on each side of vertical arm segment 136 as can be seen in FIG. 2. This guide means is in effect a sliding arm and track means provided for vertical movement of arm segment 136 in response to force transmitted by roller 133 to arm 136 by engagement of the roller with the peripheral surface of cam 132 which rotates when indexing motor 100 is energized. The elbow shaped juncture of arms 136 and 138 is in effect a cantilever support relative to the track means 140.

In addition to the arm segments, the winding head means 42 comprises a chain carrying member 145 which is part of horizontal extending arm segment 138 as best seen in FIG. 3 and which is provided with a bore 146 having a restricted central portion 147 on opposite sides of which radial or ball bearings 148 are fitted. These bearings 148 have conventional inner and outer raceways with ball bearings therebetween, and the inner raceways provide a journaling support for a pin 149 to which a snap ring 149a is attached at one end cooperable with a groove of pin 149 to which a sprocket or toothed gear member 150 is attached at the opposite end. The function of this sprocket 150 will be apparent later.

The horizontal arm 138 has another chain carrying member or cantilever support portion 138' having a bore 152 provided with a restricted portion 153 as shown in FIG. 3. Bearing means 154 are fitted on opposite sides of this restricted portion 153 and journal a shaft 156 for rotation therein. A key 157 locks a sprocket or toothed gear member 158 into engagement with shaft 156 at one end and a key 159 similarly locks a second sprocket or toothed member 160 also into engagement with shaft 156 at an opposite end. The sprocket 160 is engaged by a continuous chain 162 which is in driven engagement with a toothed member or sprocket 164 attached by means of a cap screw 166 to an internally splined hub 168 seen in FIG. 3. The hub 168 preferably is provided with a plurality of internal straight splines 169 extending longitudinally thereof in a central bore 170 and engageable by an end portion 172 having external splines 173 on a drive shaft 174 visible in FIGURES 3 and 4. The shaft 174 extends through a passage 176 formed extending longitudinally an arm segment 136. The hub 168 is journaled by thrust bearings 178 fitted into an enlarged cavity 180 formed coaxially with passage 176. The bearings 178 are preferably press fitted into cavity 180 with a bushing or spacer having a cylindrical structure 182 serving to locate separate thrust bearing pieces spaced from each other relative to a reduced diameter portion 184 of the hub 168. This spacing of the bearings 178 remote from each other provides better support for sprocket 164 during transmission of rotative force from shaft 174 through splined portions 170—172 to drive chain 162 in a direction transverse to the axis of rotation of shaft 174. Since the bearings 178 are spaced relative to each other, torque transmitted from shaft 174 to chain 162 by means of sprocket 164 is transmitted smoothly with minimum twisting or bending occurring between cavity 180 of arm segment 136 through hub 168 to cantilever extension of the chain driving means with horizontal arm segment 138. Force is transmitted from chain 162 through sprocket 160 and shaft 156 to sprocket 158 engaged by a continuous chain 192 carried by sprockets 158 and 150 of chain support portion 138' and chain carrying member 145, respectively, and movable to effect placement of a conducting wire into slots of a stator lamination assembly using the apparatus of the present invention.

Figure 4:
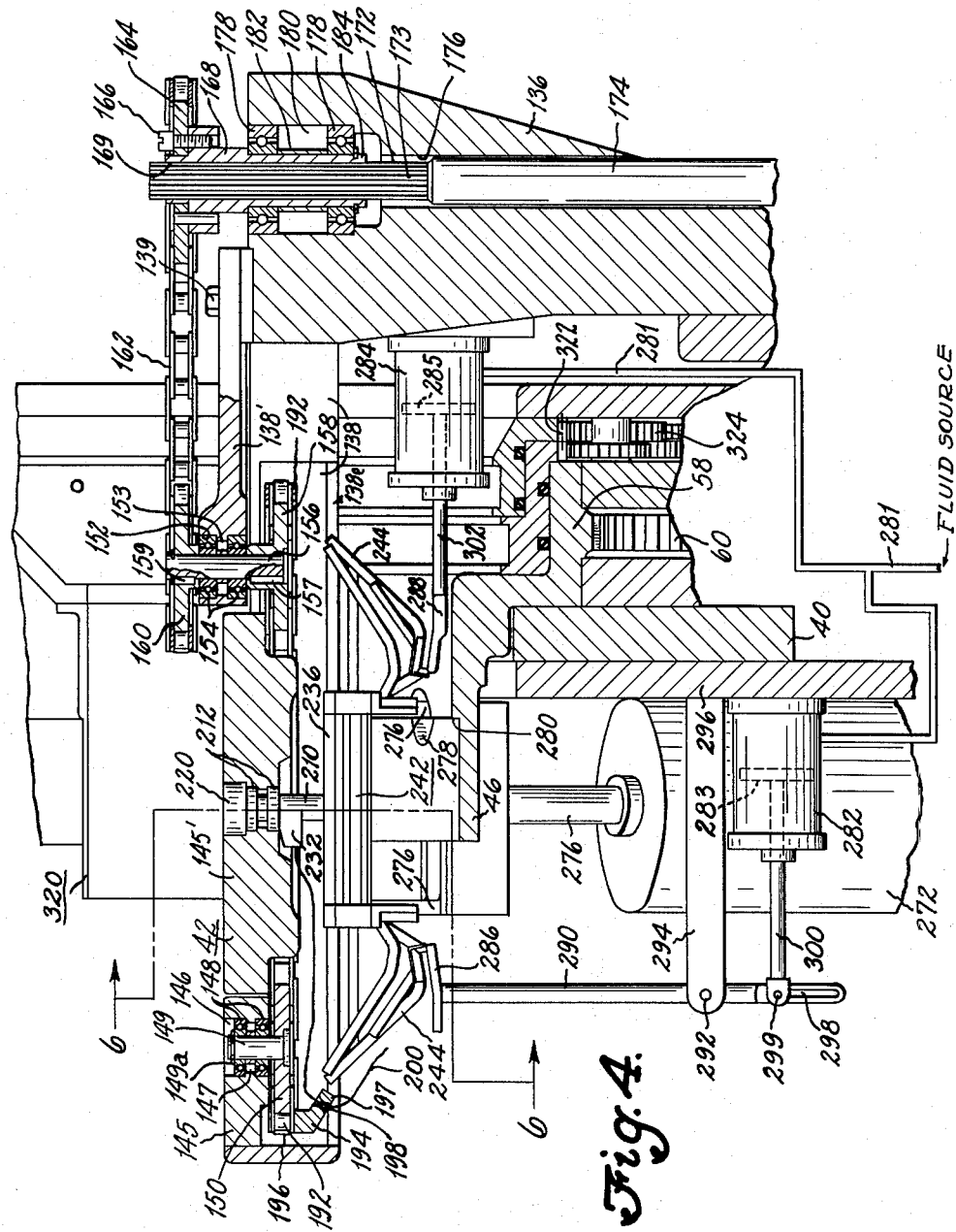
FIG. 4 is a fragmentary cross-sectional view like that of FIG. 3 with winding head structure and other mechanism moved into position for actual winding operation of the machine.
Figure 6:
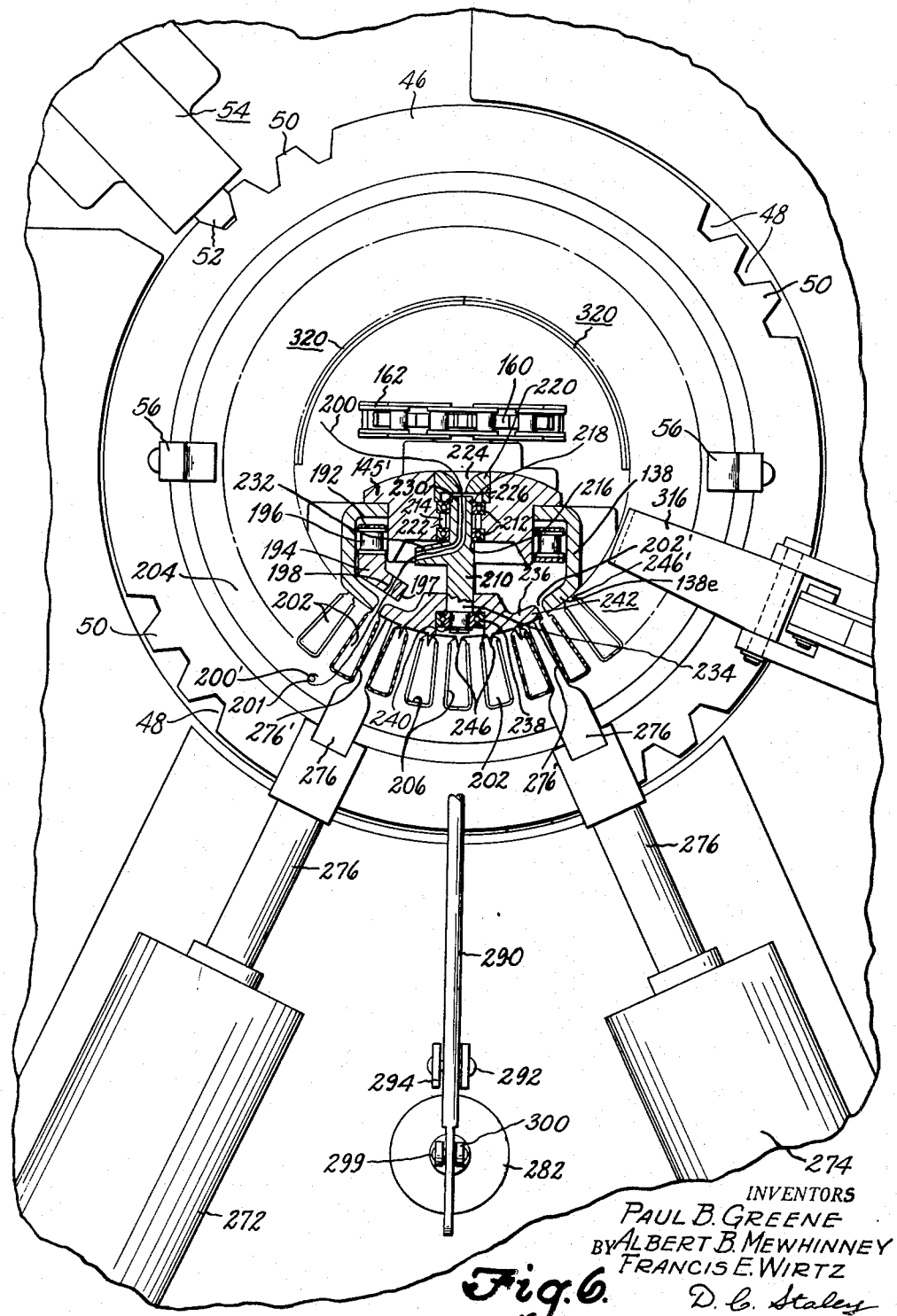
FIG. 6 is a partially sectioned fragmentary view taken along line 6—6 of FIG. 4 with a slotted stator in place.

As part of a wire guiding means provided with the apparatus of the present invention, the chain 192 carries a wire placing eyelet 194 visible in FIGURES 3, 4, and 6. The eyelet 194 is attached at one end 196 to the chain 192 and is formed with a downwardly extending portion 197 having a funnel shaped opening 198 therein through which a wire 200 is fed to slots 202 of a stator lamination assembly 204 shown in phantom in FIG. 6 together with a fragmentary actual segment of the stator lamination assembly including the slots 202 into which insulation 206 is fitted in a conventional manner.

Figure 5:
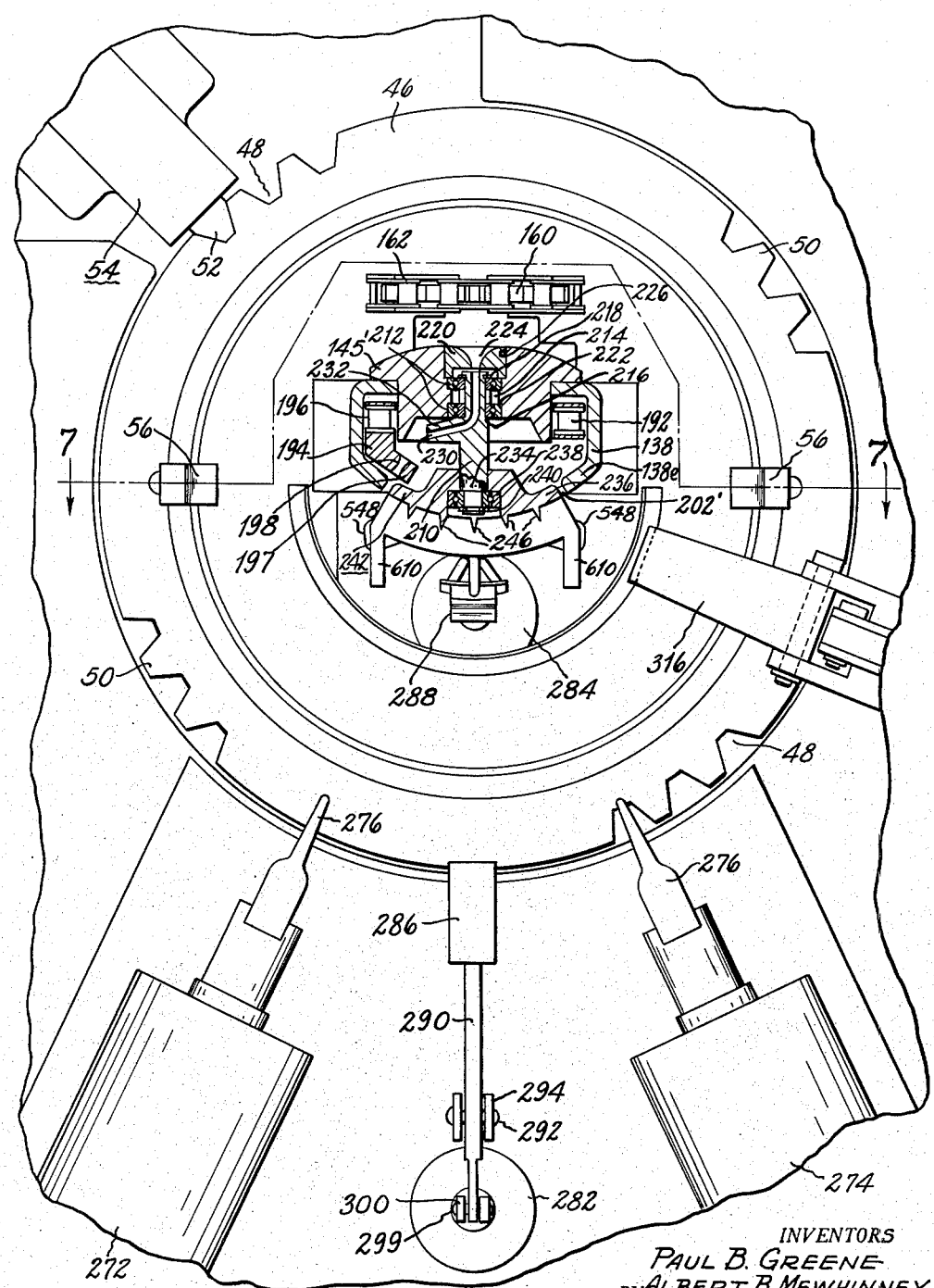
FIG. 5 is a partially sectioned fragmentary view taken along line 5—5 of FIG. 3.

The wire guiding means of the present apparatus further includes a freely rotatable snorkel member 210 supported by thrust and/or radial bearings 212 disposed in a centrally located bore 214 through a snorkel support portion 145' adjacent to the chain carrying member 145 of horizontal arm segment 138 as seen in FIGURES 3, 5 and 6. A shoulder 216 formed at an intermediate portion of the snorkel member 210 and a snap ring 218 fitted to one end of snorkel member 210 serve to retain snorkel member 210 with bearings 212 provided in bore 214 relative to the snorkel support portion 145' adjacent to the chain carrying member 145. The bore 214 has a central inwardly extending flange or shoulder 222 on opposite sides of which the bearings 212 are maintained by snap ring 218 and snorkel shoulder 216. A funnel guide 220 having a contoured central orifice 224 is fitted tightly into an enlarged bore portion 226 of bore 214 of snorkel support portion 145' adjacent to member 145. The orifice or opening 224 serves as a guide to channel wire 200 from above snorkel support portion 145' as seen in FIG. 6 to a passage 230 provided inside snorkel member 210 for feeding wire to the wire placing eyelet 194. The passage 230 is elbow shaped and extends partially in a longitudinal direction coaxially with the axis of rotation of snorkel member 210 relative to bearings 212. The passage 230 then extends at an angle relative to the axis of rotation of snorkel member 210 through a lateral extension 232 of snorkel member 210. This lateral extension 232 guides wire 200 toward the wire placing eyelet 194. The lateral extension 232 effects free rotation of snorkel 210 and follows the movements of eyelet 194 as chain 192 is driven around chain carrying member 145 by sprockets 150 and 158 during placement of wire 200 into slots of a stator lamination assembly.

Additional means for guiding the wire 200 from eyelet 194 on chain 192 are attached to a depending end 234 of snorkel member 210. As seen particularly in FIGURES 3 through 6, an intermediate member 236 is journaled through a thrust and/or radial bearing 238 to the end 234 of snorkel member 210. The bearing 238 is locked into engagement with the snorkel member by a snap ring 240. The snorkel member 210 is thus freely and rotatably connected at opposite ends between the snorkel support portion 145' carried by horizontally extending arm segment 138 and the intermediate member 236 of wire guiding shoe means generally indicated by numeral 242. In addition to the intermediate member 236, the shoe means include a pair of wire guiding shoe segments 244 on opposite ends of the intermediate member 236. These shoe segments 244 and eyelet 194 are necessary for placement of wire into proper slots 202 of a stator lamination assembly. To assure proper alignment of the winding head relative to slots for placement of wire, the intermediate member 236 is provided with a plurality of downwardly extending splines or keys 246 which are insertable into and complementary with the radially inwardly located openings of stator lamination slots 202 as seen in FIG. 6.

As mentioned above, the winding head means can be raised to be free of engagement or operative relationship with a stator lamination assembly or lowered to be in engagement with a stator lamination assembly. FIGURES 3 and 5 illustrate the apparatus of the present invention when the winding head means are in a raised position due to action of cam 132 upon arm segment 136 through roller 133 as mentioned with the description of FIG. 2. FIGURES 4 and 6 are illustrative of the positioning of the winding head means when the cam 132 is turned by indexing means driving motor 100 to a position effecting lowering of the wire guiding shoe means to a location adjacent slots of a stator lamination assembly.

A coordinating means generally indicated by numeral 250 is outlined in the view of FIG. 1. This coordinating means functions to program operational movement of the chains and wire placing eyelet of the winding head means, as well as coil and pole hooks and insulation supports, to be described, in response to indexing movement of the stator locating ring 46 carrying an annular slotted structure such as the stator lamination assembly shown therewith in FIG. 6. The coordinating means 250 includes a bank of limit switches 525 of which a phantom outline of one switch 254 is shown in FIG. 1. This switch 254 has conventional contact structure and is actuated by a roller 256 which engages a peripheral surface of a cam 258 having a depression 259 governing operation of the switch 254. The cam 258 is illustrative of a plurality of cam surfaces provided for individual switches like switch 254 each having actuating rollers moving over cam surfaces which in effect form a programming drum having a separate cam surface for each cam switch each capable of effecting energization or operation of a component such as coil hooks, pole hooks, insulation supports or a main chain and eyelet driving motor to be described in further detail below.

A program drum gear 260 carried by a shaft rotatable about axis 262 on which a gear 264 is provided in mesh with gear 60 described with FIG. 1, provides operative engagement between the indexing means gearing for angular movement of locating ring 46 to effect simultaneous rotation of program drum cam surfaces actuating limiting switches such as switch 254 to control energization of machine components such as coil hooks, pole hooks, insulation supports, or a main chain and eyelet driving motor. Since the program drum carries a gear 265 that meshes with program drum gear 260 which engages one indexing gear 60, the program drum is rotated whenever indexing driving motor 100 is actuated to effect long or short indexing movements of the locating ring 46 as well as the raising and lowering of a winding head means 42 for operation in placing wiring into slots 202 of the stator lamination assembly shown with FIG. 6. The program drum turns only during rotation of gears for indexing ring 46. There is no connection between the program drum and counter 110 but the program drum is geared only to the indexing mechanism as described. However the cam surfaces and switches of the coordinating means control a motor for forward and reverse winding of wire into slots 202 as will be described below.

The coordinating means 250 can also be provided with cam surfaces on the program drum for energization of electrical circuits through limit switches to control opening and closing of fluid pressure source valves of a conventional type that govern supply and exhaust of fluid under pressure for operating coil hooks, pole hooks, and/or insulation supports. To represent this fluid source and coordinating means relationship schematically, a line 266 connected between the coordinating means 250 and a source 268 of fluid pressure represented by a box is shown in FIG. 1. One or more switches such as switch 254 can exercise this control on valves governing supply and exhaust of fluid of source 268 for operation of several fluid actuated devices provided in combination with the winding head means 42 of the present invention. The specific valves and switches do not form part of this invention but are being mentioned to outline how coil hooks, pole hooks, and insulation supports are controlled through the coordinating means.

A schematic representation is made in FIG. 1 of a conduit 270 connected between the valve controlled source of fluid pressure 268 and actuators such as 272 and 274 having a cylindrical housing with pistons 273 and 275, respectively, indicated in phantom in each actuator. A rod and finger 276 are carried by each piston and can be reciprocally moved relative to each actuator through supply and exhaust to fluid under pressure. Each finger 276 can be moved into engagement with sides of insulation 206 placed in slots 202 and support provided by these fingers for this insulation can be best visualized in the view of FIG. 6. The fingers 276 can be seen in a side view in FIG. 3 in a retracted position relative to ring 46 into which a stator lamination assembly having slots and insulation can be inserted. As seen in FIG. 3, each actuator has front and rear fingers such as 276 for supporting insulation 206 on opposite sides of a stator lamination assembly insertable in stator locating ring 46. These fingers 276 by providing positive insulation support serve to prevent damage to the insulation during placement of wiring in the slots. As seen in FIG. 3, an opening 278 is provided adjacent a shoulder 280 formed with the inside periphery of the stator locating ring 46 so that fingers 276 can be moved to a position indicated with the drawing of FIG. 4 into engagement with and adjacent to insulation 206 in slots 202 on opposite sides of a stator lamination assembly. FIG. 4 shows a side view of the fingers 276 positioned such that if a lamination assembly with slots and insulation were shown inserted in the stator locating ring 46, the front and rear fingers 276 would be moved into engagement with such insulation to support the insulation as indicated and described with the view of FIG. 6. FIG. 6 shows an end view with the pistons of two separate actuators 272 and 274 positioned to engage the fingers against insulation 206. As can be seen in the view of FIG. 6, the fingers are located adjacent to sides 276' of the insulation when positioned to support the slot insulation during wire placing and winding operation performed by the winding head means of the present invention.

The wire 200 is attached at its free end 200' as indicated in FIG. 6 to a stationary point such as a peg 201 when a winding operation is begun. In this manner, the wire 200 is fixed relative to the stator lamination assembly when eyelet 194 starts to move in a continuous elliptical path around the chain carrying member 145 as driven by sprockets described with FIG. 3.

Again referring to FIG. 1, a connection 281 is shown schematically between source of fluid pressure 268 and an actuator 282 as well as an actuator 284 shown or outlined in FIGURES 1 and 4 and located on opposite sides of a base portion wall 286 as visible in FIG. 4. Each actuator 282 and 284 has a piston structure 283 and 285, respectively, indicated in phantom in FIG. 4. Piston actuation under fluid pressure effects movement of coil hooks 286 and 288, respectively. FIG. 3 shows these coil hooks 286 and 288 in retracted positions relative to shoe segments 236 and 244 with the wire guiding means 242. FIG. 4 shows these coil hooks 286 and 288 in operating relationship adjacent the shoe segments of the guiding means 242 functioning to assure winding of flat coils transversely across ends of the stator lamination slots as will be described in further detail later. As can be seen in FIG. 4, piston 283 of actuator 282 can effect movement of a rod 290 about a pivot pin 292 secured to a bracket 294 attached to wall portion 296 of base 40 for permitting pivotal movement of the coil hook 286 relative to the shoe segment on one side of the stator lamination assembly to be wound using the apparatus of the present invention. A slot 298 on rod 290 is engageable with a pin 299 attached to an end of a rod 300 moved by the piston 283. With the actuator 284 the piston 285 is connected directly by a rod 302 with the coil hooker 288 movable into and out of operative relationship with the shoe segments.

Further referring to FIG. 1, a conduit 310 is shown connected between fluid pressure source 268 and an additional actuator 312 having a piston 314 indicated therein in phantom for effecting movement of a pole hooker 316 into and out of engagement with completed coil windings which must be held in place in certain winding operations to prevent displacement of wire from slots such as 202. Pole hookers such as 316 preferably are provided on opposite sides of a stator lamination assembly in a manner similar to placement of the coil hookers 286 and 288 on opposite sides of the stator lamination assembly. If necessary, a separate actuator like that indicated by numeral 312 is located both in front of and in back of the stator lamination assembly. A schematic representation of the function of the pole hooker 316 is shown with FIG. 12 where the pole hooker engages completed windings placed in slots and to be retained therein during progresive winding of further lengths of wire into slots of the stator lamination assembly.

Additional provision is made with the present invention to assure that wiring already placed in slots remains in the slots as wound by the winding head means 42, in that, clamshells generally indicated by numeral 320 are provided for retaining wire in slots of the upper half and inner periphery of the stator lamination assembly. Clamshells can be seen in FIGURES 3, 4, 5, 6, and 7. One view of the clamshells 320 is obtained in FIG. 4 and a gear portion 322 of the clamshells partially visible in FIG. 4 and indicated in phantom in FIG. 2 is disposed to mesh with a plurality of gears indicated generally by numeral 324 and shown in phantom in the view of FIG. 2 as well as partially in FIG. 4. The gearing associated with the clamshells 320 is rotatable by a fragmentary gear 326 pivotable about an axis 328 by lever force transmitted through a pin 329 and connecting rod 330 visible FIG. 2. The rod 330 is attached by a pin 331 to a lever 332 pivotable relative to base 40 about a pin 333 while a roller 334 indicated in phantom engages cam 90 mentioned as being driven by the indexing means driving motor 100 in the previous description with FIG. 2. The roller in following the cam 90 effects transmission of movement through the lever 332 and rod 330 to the gearing 324—326 sufficient to move clamshells 320 out of engagement with the inner periphery of the stator lamination assembly during indexing movement to permit rotation of ring 46 yet maintaining coils which have been completely wound in the slots in proper position assuring that no displacement thereof can occur during indexing and when the clamshells engage the inner periphery of the stator lamination assembly during further winding of wire into slots 202 by the wire winding means 42.

FIG. 4 also shows a fragmentary portion of the connection between gear 60 with the gear portion 58 of the stator locating ring 46 described with the indexing operation above.

As mentioned earlier, FIG. 5 is a partially sectioned fragmentary view taken along 5—5 of FIG. 3 to show the snorkel 210 connected at opposite ends between the chain carrying member 145 and the intermediate member 236 of the guiding means carrying the shoe segments as described above.

FIGURE 5 shows the winding head means located in a position which would be out of engagement with the slots of a stator lamination assembly if such a lamination assembly were inserted in the stator locating ring 46. Similarly the fingers 276 of the insulation supports are also in a retracted position as are the coil hooker 286 and coil hooker 288 mentioned above. The coil hookers 286 and 288 as seen in the end view of FIG. 5 are positioned at opposite sides of ring 46 with their centers lying in a vertical plane passing through the axis of rotation of snorkel member 210. Thus the coil hookers are located at the midportion of any coil which is wound using the snorkel and eyelet to place wire into slots such as 202 of a stator lamination assembly. A portion of pole hooker 316 is also shown in FIG. 5 though it has been omitted for purposes of clarity from all other views except in FIG. 1 and in FIG. 12. The distinction between the coil hookers and a pole hooker lies in their function. The coil hookers such as 286 and 288 are used during the actual winding operation to form flat pancake-shaped coils in cooperation with the shoe segments mentioned above. The pole hooker 316 is used to engage completely wound coils for holding them into place as a pole just wound because the clamshells 320 at best only keep wire in slots but do not hinder wire pulling or distorting in slots and preferably do not extend into the lower half of the inner periphery of the stator lamination assembly and a coil which has been just completely wound is indexed with counter-clockwise rotation of the stator locating ring 46 to an arcuate position free of engagement with the clamshells.

FIG. 7 is a fragmentary cross sectional view taken along line 7—7 of FIG. 5 to illustrate more clearly the relationship of sprockets and chains provided with the apparatus of the present invention. FIG. 7 gives a plan view of the relationship of sprockets 150, 158—160 and 164. The journaling of these sprockets relative to the horizontal arm segment 138 including cantilever portion 138' is described earlier. FIG. 7 shows the continuous chain 192 operatively engaging the teeth of sprockets 150 and 158. Also seen in FIG. 7 is the stator locating ring 46 spaced concentrically and outwardly of the clamshells 320 mentioned with the description of FIG. 2 and also visible in FIGURES 3 and 4.

The section of FIG. 7 also passes through brackets, clamps, or keys 56 for locking a stator lamination assembly into position with the stator locating ring 46 as shown in FIG. 6 and mentioned previously with FIG. 1. The stator lamination assembly is fitted between shoulder 280 of the locating ring 46, mentioned with FIG. 3, and an inwardly directed surface 331 of each bracket or clamp 56. The relationship of this surface 331 and shoulder 230 relative to the axis of free rotation of spindle or snorkel 210 can best be seen in FIG. 7 where a top view of the funnel 220 is visible with passage 224 through which wire is guided as shown in FIG. 6. A pair of lines 332a and 333a are shown in FIG. 7 drawn through the axis of rotation of snorkel 210. The line 333a extends transversely of chain 192 engaged by sprockets 150 and 158 and represents the median location of longitudinal distance between surface 331 and shoulder 280. The line 332a is normal to line 333a and intersects the axis of rotation of sprockets 150, 158—160, and 164. It should be noted that the distance of the axis of rotation of sprocket 150 and sprockets 158—160 to line 333a is the same on either side of line 333a at its intersection with line 332a at the axis of rotation of snorkel 210.

Eyelet 194 which is carried by continuous chain 192 around the sprockets 150 and 158 is moved symmetrically relative to the axis of rotation of snorkel 210 for placement of wire 200, as indicated in FIG. 6, into radially inwardly extending slots of a stator lamination assembly. This symmetry also prevails as to the wire guiding means 242 including intermediate member 236 and shoe segments 244 attachable to snorkel 210 by means of intermediate member 236 as clearly seen in the side views of FIGURES 3 and 4. It is to be understood that with varying stator lamination assembly width or depth relative to surface 331 and shoulder 280, the apparatus of the present invention can be made easily compatible with any stator lamination assembly depth first of all by using other brackets having greater length than brackets 56 illustrated in FIG. 7 and attached to the stator locating ring 46 to provide greater distance between surface 331 and shoulder 280. When such a modification is made, the location of the median line 333a relative to the depth of stator laminations in the stator assembly is shifted either further away from or closer to the shoulder 280 depending upon whether the depth is greater or less than that represented by the dimensions of structures shown with FIG. 7. In this event, the winding head means 42 being formed of a horizontal arm 138 attached by bolts 139 to the segment or arm 136 as described with FIG. 3, can be interchanged with a different horizontal arm to form a different length of cantilever relationship for the axis of rotation of spindle 210 which then again coincides with the line 333a to be at the median position relative to shoulder 280 and inner surface 331. Accommodation of a different depth of stator lamination assembly also necessitates use of a different intermediate member 236 having either greater or less longitudinal dimension relative to the line 332a for symmetrical location of wire guiding means having the intermediate member and shoe segments 244.

Further referring to FIG. 7, the relationship of chains 162 and 192 relative to each other can be seen more clearly. It is preferred that the eyelet 194 travels a path with continuous chain 192 at a speed which is equal and/or proportional to peripheral speed of rotation of the driving sprocket 164 engaged with chain 162. Therefore, chains 192 and 162 are shown in FIG. 7 having an equal number of links in each chain. Since the sprockets 160 and 164 are closer to each other than are the sprokets 150 and 158 relative to longitudinal spacing along line 332a, an idler sprocket 340 with teeth engageable by chain 162 is provided adjustable in a slot 342 of a laterally extending bracket 344 formed integrally with or adjustably attached to the horizontal arm segment 138. Thus all sprockets in driving engagement with chains 162 and 192 are in some way attached to the horizontal arm segment 138. When a horizontal segment having a different longitudinal distance between the axis of rotation between sprockets 150—158—160 is attached to vertical arm or segment 136, the idler sprocket 340 can be adjusted relative to slot 342 to make the chain 162 positively engage the driving sprocket 164 attached to the splined hub 168 driven by shaft 174 as explained in the description with FIG. 3.

The shaft 174 is visible in the rear view of the machine in FIG. 2 and motive power is supplied thereto by way of a gear reduction means or gear train generally indicated by numeral 350 which is connected to be driven by a motor means or main driving motor generally indicated by numeral 352 in FIG. 2. A schematic power line 353 is shown connected between motor 352 of FIG. 2 and coordinating means 250 of FIG. 1. This driving motor 352 for the chain drive is mounted on the base 40 in a vertical position as shown by the drawing of FIG. 2. A shaft 354 extends from the motor 352 to the gear reduction means 350 specifically entering a gear box portion 356 of the gear reduction more clearly visible in the fragmentary cross sectional view shown by FIG. 8.

FIG. 8 shows a pinion gear 358 on shaft 354 of motor 352 engaging gear 359 which engages gear 360 engaging gear 361 of a gear train. Gears 359, 360 and 361 are rotatable about shafts 362, 363 and 364, respectively, within the gear box 356 for transmission of driving force to a gear 366 meshing both with the teeth of gear 361 and with a pinion 368 attached to cause rotation of shaft 174 shown in the partial cross-sectional view of FIG. 8. Also visible in FIG. 8 is a cross-sectional view of the track means or dove-tail guide 140 between base 40 and vertical arm segment 136 as described with FIGURES 2 and 7.

Energization of the motor 352 for the chain drive is dependent both upon the coordinating means 250 and upon a slip-ring means 370 which is visible also in the rear view of the machine in FIG. 2 and can be seen in greater detail in the vertical cross sectional view of FIG. 9. The slip-ring means 370 comprises a rotor portion 372 and a brush portion 374 as seen in both FIGURES 8 and 9. As best seen in FIG. 9, each brush portion 374 comprises a brush supporting member 376 attached by suitable means such as bolts 378 to a support means 380 associated with the gear reduction means 350. A gear 382 provides connection of rotor 372 by way of a gear 384 on the rotor relative to the rotatable gear 366 which meshes with pinion 368 on shaft 174 and gear 361 as seen most clearly in the view of FIG. 8. A bevel gear 386 is also attached to shaft 388 of rotor 372 to rotate with the gear 384 supported by bearings 387 and 387' fixed to a support 389 having upper and lower portions which are part of the gear reduction housing generally indicated by numeral 350. Bevel gear 386 meshes with a second bevel gear 390 carried on shaft 392 visible in both FIGURES 2 and 9, for driving engagement by way of gear 394 and gear 396 on a shaft 398 of counter 110 as seen best in FIG. 2.

As seen in FIG. 9, a key 399 interlocks gear 384 with shaft 388 assuring that the rotor 382 of the slip-ring means is always rotated in time with the driven chains 162 and 192 through positive gearing engagement relative to driving shaft 174 as described above. Due to the spline connection between shaft 174 and drive sprocket 164, the driving motor 352 for the chain means is always in driving engagement with the chains of the apparatus of the present invention. This condition exists both when the winding head means 42 are positioned in engagement with a slotted stator lamination assembly or when an indexing operation is occurring when the arm segment 136 is moved upwardly away from engagement with an inner periphery of a stator lamination assembly by cam 132 as described with FIG. 2 above. The direction of rotation of the driving motor 352 is governed by the program drum having a cam surface such as 259 cooperable with a limit switch such as 254 referred to in description accompanying FIG. 1 above. Thus, limit switches such as 254 control reversal of the driving motor means 352 to effect rotation either in counter-clockwise direction or clockwise direction through shaft 174 transmitting driving force by sprockets to the chains 162 and 192.

The rotor 372 of the slip ring means comprises an annular insulating member 402 carried by the shaft 388 as seen in FIG. 9 as well as metallic conducting portions 404 and 406 which are engageable by brush means 408. Since the slip-ring rotor rotates due to a connection with the gear reduction means and since there is also a connection between the rotor of the slip ring means by way of shaft 388 through bevel gears 386—390 to the counter 110 there will be intermittent engagement between conducting portions 404 and 406 with brushes 408 for completion of electrical circuitry through electrical connection indicated schematically by line 409 shown partially in FIGURES 1 and 2 between the slip ring means and limit switches of the coordinating means. The counter 110 tied by gearing to the slip ring means controls operation of indexing switch 102 through connection 104 and switching in 102 is connected by line 103 to indexing motor 100. Operation of the indexing motor 100 also effects rotation of the programming drum and a particular cam surface which energizes a switch such as 254 at an instant when a brush and conducting portion of the slip ring means engage each other as the program drum effects stopping of main driving motor 352. Stopping motor 352 stops the chains. This stopping of the chains is adapted to result in positioning of eyelet 194 relative to a slotted stator lamination assembly or annular structure inserted or mounted in the stator locating ring 46 at left front, right front, left rear or right rear of a loop defined by slots being wound with wire 200. The diagram of FIG. 12 to be described later shows the winding sequence more fully.

The counter 110 can be provided with suitable means such as switches which function to control speed of motor 352 before final stopping of chain movement so as to first permit a slowdown of the speed of rotation of gearing and chains and then to effect a complete stopping action within a limited number of turns such as three or four wire loops placed into the slots. If a slowdown in speed of chain rotation is provided, there is assurance that the eyelet 194 will be moved to a proper stopping position adjacent a winding slot near the stator lamination assembly at either the front or back at the left or right of the pair of slots being wound with wire 200 by the winding head means 42. The counter 110 may have two switches operable within 3 or 4 turns of stopping the chains with the first switch effecting a change in control of motor 352 to cause slowing down and with the second switch actually effecting stopping of turning of the chains. A line 401 from such a switching means 400 adjacent to and associated with counter 110 is shown in FIG. 2 leading to motor 352 for a schematic representation of this relationship. A program limit switch sets the actual stop by completing a proper brush circuit for front or rear left or right stopping of eyelet 194 of chain 192. The slip ring means are always in time with the chain through positive gearing, a feature which is necessary for proper stopping. There is no direct connection or tie-in between the programming drum and the counter 110, but the programming drum is connected to cooperate with the indexing mechanism through gearing as described above. The programming drum actuates reversal of the main driving motor 352 as mentioned and the brushes cooperating with the slip ring conductors control the exact stopping position for eyelet 194 relative to the slots of a stator lamination assembly by having a part in making or breaking electrical connection for stopping and effecting reversal of motor 352 through switches of the program drum while the counter 110 effects temporary operation of the indexing motor 100 which results in sequential turning of the program drum to operate cam switches that determine stopping and forward and reverse operation of motor 352.

Figure 10:
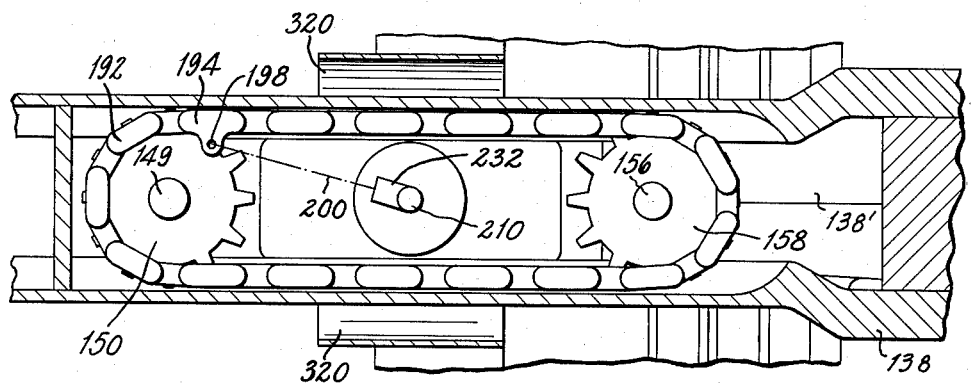
FIG. 10 is a fragmentary partially sectioned view taken along line 10—10 of FIG. 3.

Symmetrical relationships between the axis of sprockets 150 and 158 relative to the freely rotatable snorkel 210 were described earlier in referring to FIG. 7. FIG. 10 is a bottom view of the chain 192 to which the eyelet 194 is attached. The symmetrical relationship of the sprockets 150 and 158 relative to snorkel 210 can be seen also in FIG. 10. In addition, FIG. 10 shows how the lateral portion 232 of the snorkel 210 is directed toward passage 198 for guiding of a wire such as 200 to a proper position relative to slots of a stator lamination assembly. The opening 198 of eyelet 194 travels a path which is parallel to the path of chain 192 but which is disposed radially inwardly of chain 192 relative to the sprockets 150 and 158. Clamshells 320 are also visible in the view from the bottom up toward the chain and eyelet of the winding head means as viewed in FIG. 10.

Figure 11:
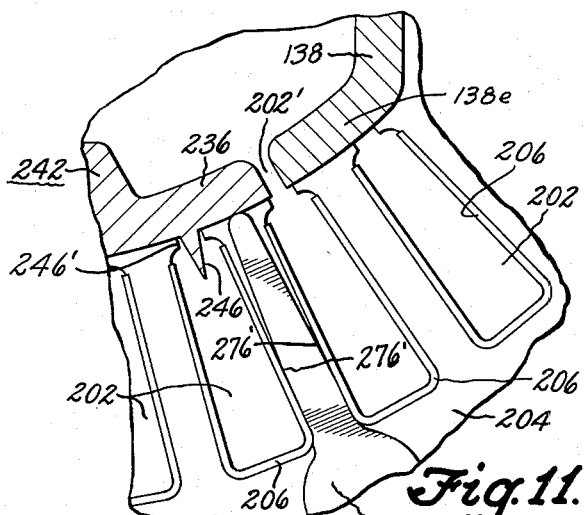
FIG. 11 is an enlarged fragmentary close-up view of mechanism of the coil winding machine cooperating with a slotted annular structure into which wiring is coiled.

FIG. 11 is a fragmentary enlarged view showing intermediate members 236 of the winding head means immediately adjacent inner peripheral openings of slots 202 of a stator lamination assembly shown also in FIG. 6. Keys or splines 246 mentioned in the description with FIG. 6 engage these radially open ends of slots 202 and FIG. 11 shows one such key or spline 246 in engagement with an opening 246' of one of the slots 202. Insulation 206 mentioned with the description of FIG. 6 is also shown in FIG. 11 located with each of the slots 202 and an insulating supporting finger 276 is also shown more clearly relative to sides 276' of the insulation 206. Only a fragment of the stator lamination assembly or slotted annular structure 204 is shown with FIG. 11. A gap or slot 202' is formed between the intermediate member 236 and a channel portion or end of rack-like member 138 attached to the winding head means 42. The attachment of the channel portion 138e is specifically made through the arm segment 138 extending horizontally in a cantilever fashion from the vertical arm segment 136 to form an elbow-shaped structure with the winding head means. The purpose of the channel or end portion 138e is to provide a shield for the chain 192 as seen in the end views of FIGURES 5 and 6, and also to form the gap or slot opening 202' further aiding in guiding of wire such as 200 into slots 202 of the stator lamination assembly by way of the snorkel member 210 and eyelet 194.

The wire winding machine of the present invention can be used to wind coils in slots of a stator lamination assembly in various electrical patterns for effecting certain phase relationships between various windings. The machine of the present invention can be used to wind single phase windings with a stator lamination assembly and also can be used to wind multiple-phase windings, such as a three-phase winding, for a slotted annular structure. For economically winding various phases of windings, several wire winding chains and horizontal arms similar to one illustrated in the subject invention can be provided with varying structural dimensions between the snorkel and sprockets of the winding head means or with varying shoe segments 244 for intermediate member 236 used in effecting placement of wire in various phase relationships at varying depths with the slots of a stator lamination assembly while being able to use the apparatus described. In such applications, it is necessary to stop production usage of the machine for only a short time to interchange a winding head means on horizontal arm segment 138 or to interchange only the shoe segments such as 244 attached to the intermediate member 236. Thus, the wire winding apparatus of the present invention can be used to place wiring in slots of an annular slotted member on a mass production basis without changing or disassembling any part of the wiring head means so long as the wiring is being placed in coils at a predetermined slot depth of the lamination assembly. Shoe segments 244 are interchanged for winding wire into slots at various depths. Indexing of the stator supporting ring 46 as well as movement of the winding head means away from and into operative relationship with slots of a slotted stator lamination assembly can occur while driving connection is maintained with the chains and sprockets of the winding head means through the splined connection between shaft 174 and sprocket 164 as described above.

Figure 12:
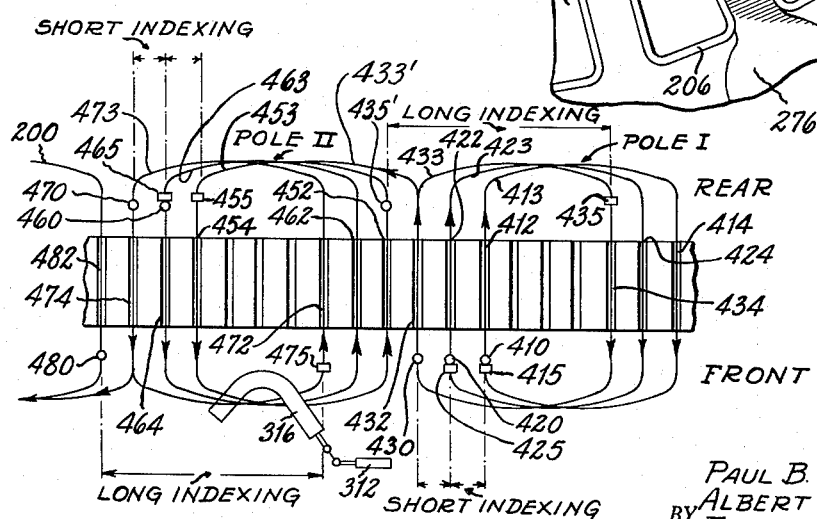
FIG. 12 is a schematic diagram of a portion of a winding pattern showing location of coils with respect to slots followed by the coil winding machine in winding multiple electrodynamo machines.

FIG. 12 illustrates windings placed in stator lamination assembly slots in a developed view of the slots. Only a fragment of a three-phase winding is shown in FIG. 12 and the particular winding involves three coils wound with the slots per pole of the particular sample windings. In the operation of the machine of the present invention the indexing mechanism described above effects movement of the elbow-shaped or cantilever type winding head means into a position cooperating with the slotted annular structure of a stator lamination assembly such that the shoe segments are placed on opposite sides of the slotted annular structure and the intermediate member on which the shoe segments are mounted engages the slots through splines 246 as illustrated in FIGURES 6 and 11 so that the eyelet 194 travels with chain 192 in a closed loop path with downwardly extending portion 197 of the eyelet causing a wire to be wound in a coil placed in the slots as guided through the snorkel member 210, eyelet 194 and gap 202′ described above.

Referring to FIG. 6, the winding is started by attaching an end to 200′ of wire 200 to peg 201 so that the wire is anchored as the winding operation is started. Then, referring to FIG. 12, the eyelet traverses a continuous looped path with chain 192 starting from a point indicated by a round circle at 410. A coil of wiring is placed into slots 412 and 414 in a clockwise direction of winding as viewed in FIG. 12 and as indicated by the arrows with the winding line of coil 413. The machine of the present invention remains in an operative relationship relative to slots 412 and 414 until a sufficient number of turns of wire have been placed in the slots for forming a completed coil 413 and then the brushes of the slip ring means are effective together with the counter 110 and coordinating means 250 for causing a stop in the movement of eyelet 194 at a position indicated by the square at point 415 at a left front location of coil 413 as viewed in FIG. 12. At this point the cam surface on the program drum engages an appropriate limit switch similar to illustrated switch 254, for example, causing deenergization of main winding motor 352 while indexing switching means 102 effects energization of the indexing motor means 100 whereby the mechanical interaction of cams driven by the indexing motor occurs as described with FIGURES 1 and 2 to effect both a shifting or indexing movement of the stator locating ring 46 and program drum through discs 64—66 and a raising movement of the winding head means 42 by cam 132 to prevent engagement of winding head means with a stator lamination assembly during shifting or rotating of the locating ring 46 by an angular distance equal to the angular distance between pairs of slots to be wound sequentially with loops of coils. This angular distance so far as the locating ring 46 is concerned means a movement in short indexing from a recess 48 to an adjacent recess on the opposite side of a tooth 50 after the cam mechanism has effected retraction and reinsertion of the shot pin 52 of the indexing locking cylinder means 54 described with FIG. 1. At this point, the eyelet 194 is still in a left front position with respect to the stator lamination assembly as shown in the view of FIG. 12 and once again the main driving motor 352 is energized through cam switches on the programming drum of the coordinating means to effect rotation of the chains with the eyelet starting placement of wire from a point represented by a circle 420 in FIG. 12 and moving in a counterclockwise direction until the counter and slip ring and brush means effect a slowdown and stop in the winding of a wire into slots 422 and 424. The stop is not effected until a completed coil 423 has been placed in these slots and then the eyelet again comes to rest at a point indicated by a square 425 in the lower left front corner of the windings as represented in FIG. 12. Again a short indexing operation occurs involving the shot pin, the winding head means, and the stator locating ring for shifting of movement from one pair of slots to an adjacent pair of slots and a starting of a third coil for the same pole occurs at a circle point 430 with the winding progressing with placement of wire into slots 432 and 434 until a coil 433 is completed at which time the brush and slip ring assembly together with the counter, program drum, and coordinating means effect a stop in winding at a point indicated by a square 435 located at the right rear of coil 433 as viewed in FIG. 12.

Since the desired three coils per pole have now been completed using short indexing movement effected by disc 66 of FIG. 1, an indexing movement is needed to shift the stator locating ring 46 carrying the stator lamination assembly by an angular distance from one quadrant of recesses 48 to an adjacent quadrant of recesses 48 shown in FIG. 1 to a point indicated by a circle marked 435′ for beginning the first coil winding of the second pole. This beginning point 435′ is located at the right rear relative to slots 452 and 454 as viewed in FIG. 12. Since the windings now are to be formed for an adjacent pole necessarily having opposite electrical polarity relative to the pole wound immediately preceding, the direction of winding movement is reversed to a counterclockwise winding operation whereby eyelet 194 is rotated with chain 192 in a counterclockwise direction as driven by the main driving motor 352. After completion of the required number of loops in placement of wire in the slots 452 and 454 by the eyelet 194, the eyelet is stopped at a left rear position indicated by a box or square 455. Again a short indexing movement occurs from a position at the left rear of coil 453 whereby the eyelet is moved to a starting point indicated by a circle 460 at the left rear relative to slots 462 and 464. Counterclockwise movement occurs effecting a winding of coil 463 until the required number of loops have been completed and then the eyelet is stopped at a point indicated by a box or square 464 whereupon another short indexing movement occurs from one adjacent slot to the next involving angular movement between adjacent recesses 48 of the stator locating ring 46 causing positioning of the eyelet 194 at a point at the left rear indicated by a circle numbered 470 at which point a third coil is wound for the second pole again moving in a counterclockwise direction placing wire into slots 472 and 474 to form a coil 473 until a completed number of turns has been made and the eyelet is stopped at a position at the right front of the coil 473 relative to slots 472 and 474 at a stop position indicated by a box or square 475. Since another group of three coils are completed now for the second pole, a long indexing movement occurs as effected by the rear disc 64 of FIG. 1 and the eyelet 194 is shifted to a new position at the right front location of the first coil of a third pole to be wound having opposite polarity relative to the second pole by movement in a clockwise direction again starting in a point indicated by a circle 480 adjacent slot 482. Wire 200 is never pulled out of slots during short or long indexing because a free lateral end portion 433′ does not bind in slots during long indexing and in short indexing adjacent slots are close enough together so that wire is not pulled out of slots but rather the point where the eyelet stops is far enough from the end of the slot to provide sufficient length of wire for short indexing movement without hindrance.

Figure 19:
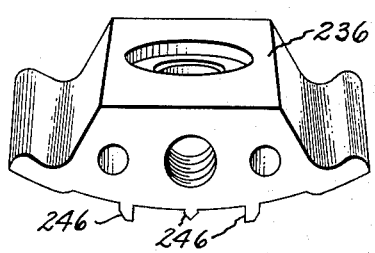
FIG. 19 is a perspective view of an intermediate member of a wire-guiding shoe with a slot-aligning key portion used to join the paired segments of FIGURES 13 to 18 for use with the apparatus of the present invention.

The winding operation for a three-phase multiple pole machine as represented schematically by FIG. 12 progresses about the inner periphery of slotted annular structure until all coils for a particular phase have been placed in the slots as required for the electrical design characteristics of a particular stator lamination being wound. Depending upon the desired placement of wiring coils in the slots, the shoe segments 244 are attached to the intermediate member 236 of the wire winding means in accordance with the depth of placement of wiring desired with particular coils being placed. Accordingly, FIGURES 13–18 illustrate various shoe segments which can be used for placement of wiring into varying depth positions relative to the slots of a stator lamination assembly. FIG. 19 shows a perspective view of the intermediate member 236 to which the shoe segments are attached on opposite sides. When wiring is being placed at a maximum depth in the slots, shoe segments such as illustrated in FIGURES 17 and 18 are attached by any suitable means, such as screws, to the opposite sides of the intermediate member 236.

FIGURES 20, 21, and 22 illustrate use of the shoe segments of FIGURES 17 and 18 in fragmentary views of one-half of the intermediate member 236 for forming coils 500 having flat end cross sections as indicated in the FIGURES 20–22. The function of the coil hookers 286 referred to with FIG. 3 is to cooperate with the shoe segments 244 so as to form a flat configuration of individual coils relative to the wire placed in the slots and looped transversely between ends of slots on opposite sides of a stator lamination assembly. FIG. 20 shows one such flat coil wound by movement of eyelet 194 in the path as governed by chain 192 and FIG. 21 shows a second flat coil wound between the shoe segment 244 and coil hooker 286. With each indexing movement, the coil hooker 286 is pivoted free of engagement with the previously wound coils to a position as indicated in FIG. 2. If winding of the same pole continues, the coil hooker is engaged over the top of the previously wound coil leaving a space between the coil hooker and adjacent shoe segment into which a subsequent flat coil for the same pole is wound as represented by FIGURES 21–22. A pole hooker is actuated to engage wound coils as indicated schematically by pole hooker 316 indicated in phantom lines about one side of a completed pole #2 in FIG. 12. The clamshells hold completed coils in place as noted earlier but a pole hooker is provided to engage coils of poles not retained by the clamshells. The pole hooker 316 is intended to hold down a pole group of coil windings which have just been completed so that the wiring will not be dislocated from the slots into which the wire was placed by eyelet 194. As illustrated in FIG. 22 the coil hooker continues to cooperate with the shoe segment to form a third coil for the first pole formed having flat coil ends shown by FIGURES 20–22.

A different size of shoe segment 244' is used with intermediate member 236 when the winding is to be placed in slots at a different depth for a different phase winding. First a three-phase winding, all poles of one phase are wound the same depth. Indexing movements occurs as indicated schematically in FIG. 12 in sequential winding of the first three coils having flat ends as represented by FIGURES 20–22 and a following pole with three coils is wound in a counterclockwise direction and so on alternately until one whole phase winding is completed. For the second phase winding, at a different depth, shoe segments 244' as represented by FIGURES 23–25 are attached to opposite ends of intermediate member 236. Three coils are then wound for each pole at this depth using shoe segments 244' cooperating with the coil hooker 286 to form flat coils as described previously. Finally, for placement of coils in the uppermost portion of slots of a slotted annular structure, a third size of shoe segment 244" shown in FIGURES 13–14 are attached on opposite sides of intermediate member 236 permitting wire to be placed in proper slots through movement of eyelet 194 such that further flat coils are formed in stacked relationship to the previously formed coils and placed in proper slot positions as required for a particular winding installation. FIGURES 26–28 illustrate use of the shoe segments 244" at a third depth position relative to the slots for forming flat coil ends stacked over previously wound coils of wire.

Referring in particular to shoe segments 244 of FIGURES 17 and 18 which are attachable as a pair to the intermediate member 236 of FIG. 19, it is to be noted that each shoe segment 244 is formed comprising the following parts especially adapted to cooperate with eyelet 194 in placement of wire relative to a particular pair of slots of a stator lamination assembly. Each shoe segment 244 is provided with a pair of side struts 544 visible as viewed from an end position in FIGURES 17 and 18 and visible in a side position in FIGURES 20–22. These side struts 544 are preferably metal rods which are suitably attached or welded to a mounting platform 546 having a pair of apertures 547 therein for receiving mounting screws or bolts for attachment of the shoe segment to intermediate member 236. Each rod or strut 544 is contoured to have an arcuate portion 548 against which wire 200 is urged by movement of eyelet 194 over a transverse and arcuate path greater in length than the distance between ends of slots into which wire is wound using eyelet 194 carried in a circuitous path by chain 192. Each strut 544 of a pair provided on each shoe segment extends relative to the other in a direction away from the intermediate member 236 or platform 546 to a juncture with a central strut 560 remote from the mounting platform. The central strut 560 lies in a path coinciding with a plane which may be projected vertically through the line 332a referred to with FIG. 7 relative to symmetrical relationship of various winding head means components such as the sprockets and snorkel. The central strut 560 forms part of a coil flattening portion of each shoe segment including a pair of additional intermediate struts 562 welded or suitably attached to central strut 560 at an intermediate location 563 and joined to an arcuate or curved member 564 attached to struts 562 and 560 at an end of strut 560 remote from the juncture of strut 560 with struts 544. The struts 560 and 562 are positioned in spaced relationship to coil hooker 286 as indicated in FIGURES 20–22 for forming a flat, pancake-shaped coil end for each coil. The curved member 564 is formed and located to be spaced below the bend 548 formed with each side strut 544. Thus as eyelet 194 moves with chain 192 around either sprocket 150 or sprocket 158, the eyelet 194 places a wire such as 200 around the outermost end of central strut 560. The wire is placed symmetrically on either side of this central strut 560 and is forced downwardly to intermediate portion 563 of the central strut simultaneously with movement along side struts 544 to be ultimately engaged by intermediate struts 562 to below curved member 564 for movement into position extending transversely of ends of the slots of a stator lamination assembly. The bend 548 on the side struts 544 effects downward bending of the wire relative to the slots into which it is being placed assuring that the wire is contoured into a loop for forming a coil flattened between the curve member 564 and the coil hooker 286. Depending upon the relative sizes and shapes of the struts 544, 562 and 560, wiring can be formed into coils placed at various depths as represented in groups by FIGURES 20–22, FIGURES 23–25, and FIGURES 26–28.

Comparable struts and shoe segment parts in the illustrations of FIGURES 15 and 16 and FIGURES 13 and 14 corresponding to struts and parts of shoe segments shown in FIGURES 17 and 18 are indicated by reference numerals having a prime for FIGURES 15 and 16 and a double prime for FIGURES 13 and 14. Thus the central strut in the pair of shoe segments of FIGURES 15 and 16 are shown as 560' and the same central strut for a more shallow placement of wiring relative to slots of a stator lamination assembly are indicated with a numeral 560" for FIGURES 13 and 14. A similar relationship prevails for the corresponding other reference numerals used in FIGURES 13 through 18.

It is to be understood that in the operation of the apparatus for winding wire as coils into slots of a stator lamination assembly, the shoe segments 244, 244' and 244" are in cooperative relationship relative to the stator lamination assembly 204 as shown in fragmentary VIEWS 20–28 such that coils are formed as wire is placed around the shoe segments and pulled taut by progressive movement of eyelet 194 following the path of chain 192. Using the particular shoe segment 244 of FIGURES 20–22, it can be seen that first the wiring is placed near the bottom or at the bottom shown by arrow 602 of each slot 202. When using the shoe segment such as 244' for placing wire at an intermediate depth as with FIGURES 23–25, wire is placed in slots such as 202 of the stator lamination assembly 204 at an intermediate level indicated by arrow 604. When the shoe segment 244" is used as illustrated in FIGURES 26–28, wiring is placed in slot 202 of stator lamination assembly 204 at a top portion of the slot as indicated by an arrow 606.

The coil hookers 286 can be moved either by means of a hydraulic actuator modified for different depth locations of coils by addition of a separate cylinder permitting vertical movement of the coil hooker relative to the curved member 564, 564', and 564" of the various shoe segment structures or a coil hooker rod 290 of different length may be attached to the actuator 282 each time a different shoe segment is used on opposite sides of intermediate member 236. As the struts of the shoe segment and coil hooker 286 are used to form flat pancake-shaped coil structures on opposite sides of a stator lamination assembly as the eyelet 194 places wire around shoe segment on opposite sides of the intermediate member 236, the wire is pulled to a location between the curved member 564 and coil hooker 286 such that the wire end passing longitudinally through each slot 202 is pulled positively into a rectilinear cross-sectioned stack of conductors such that the wire is placed in the slots longitudinally thereof to a depth indicated by either arrows 602, 604 or 606 depending upon the particular shoe segments being used. As the wire is pulled taut into a completed coil lying at a depth indicated by arrows 602, 604, or 606, a pair of legs 610 extending downwardly from the shoe segment platform 546 are adapted to provide a final guide for placement of wire into slots 202 such that insulation as represented by numeral 206 in FIG. 6 is not dislocated from engagement with the side walls of the slots 202 so as to force the wire between the side walls of the slots and the insulation rather than inside the insulation relative to the slots. These legs 610 can be modified slightly as represented by legs 610' and 610" with the shoe segments of FIGURES 15 and 16 and FIGURES 13 and 14, respectively, so that equivalent guiding action of the wire relative to the insulation and slots occurs when the wire is placed to depths indicated by arrows 604 and 606, respectively, as represented in FIGURES 23–25 and FIGURES 26–28, respectively. The mounting platform 546' used with the shoe segments 244' of FIGURES 15 and 16 may be cut away as indicated by cutouts 546'a and 546'b, respectively, when particular coil placement requires added clearance space below the platform 546' relative to slots of a stator lamination assembly.

As indicated with FIGURES 13 and 14 an additional guide strut 612 can be attached to mounting platform 546" at a location adjacent the legs 610" to assure positive placement of wire to the desired depth such as indicated by arrow 606 for the shoe segments 244". This modification can include a separate side strut 644 on one side of central strut 560" while the side strut 544" is bent to a slightly different shape involving a transverse portion 645 joining the side strut 544" to the central strut 560".

The legs 610, 610' and 610" as well as the fingers 276 shown in FIG. 6 serve to protect insulation 206 from tearing or damage by wire 200 as it is wound into the slots. The legs also help to guide and hold the wire into the slots.

The wire winding machine of the present invention as herein disclosed is particularly adapted to wind constant pitch coils without tearing or pulling wire out of any slot into which it has been placed. The indexing means together with the winding head means and shoe segments permit placement of wire in a clockwise or counterclockwise moving pattern governed by a coordinating means which is effective to program operation of various components of the apparatus for serving the functions as described above. The freely rotatable snorkel which cooperates with the eyelet carried on a continuous chain as well as with the shoe segments and other parts of a winding head means provide a positive guiding means for wire to be placed into slots of a stator lamination assembly. With the wire winding means of the present invention it is possible to index the stator lamination assembly and winding head means relative to various slots of a stator lamination assembly and simultaneously to maintain a drive connection between driving motor means 352 and the chains 162 and 192 because of the splines between shaft 174 and hub 168 as described above. The chains drive the eyelet 194 in a looped or elliptical path from inside the stator lamination assembly further permitting the driving connection to be maintained relative to the chains. The freely rotatable snorkel 210 provides a central located guide permitting high speed placement of wire into slots while the coil hookers cooperating with the shoe segments assure formation of flat coils in a pancake type winding. By use of various winding head means on the elbow shaped or cantilever arm segment structure as described above it is possible to use the machine of the present invention with various stator lamination assemblies for winding single phase or multiple phase dynamoelectric machine components. With the wire winding means of the present invention, wire is shuttled by the eyelet 194 on chain 192 through selected stator slots to form constant pitch winding therewith. Since the eyelet can be stopped at either right or left and front or rear positions relative to the stator lamination assemblies on either of the pair of slots into which wire is being placed, indexing of the stator lamination assembly by movement of stator locating ring 46 can be effected without tearing or pulling of the wire. Tearing and pulling of wire is eliminated by stopping the eyelet at an appropriate point leaving a free length of wire portion of a loop from that particular stopping point to permit movement about an arcuate distance to a subsequent starting point during indexing of stator locating ring 46. The shoe segments and also the insulating protecting fingers 276 protect against tearing of insulating paper placed in each of the stator lamination slots.

While the embodiments of the present invention constitute a preferred form, it is to be understood that other forms might be adopted.

What is claimed is as follows:

1. A coil winding machine, comprising a base portion and a winding head portion movable reciprocally in a linear back and forth path, means carried by said base portion for positioning a slotted annular member in rotatably indexed locations relative to said winding head portion, means including power-driven cams attached between said base portion and said head portion and operable to move said winding head portion into operative relation with the slotted annular member, a continuous chain rotatably disposed on one side of said winding head portion and connected at all times in a power-driven condition, means including a snorkel member carried by said winding head portion for feeding a wire to said chain, and means for guiding the wire from the chain to a slot of the annular member, said wire guiding means having a location to one side of said winding head portion and joined thereto by said snorkel member which is movable at all times completely about its own axis during wire feeding.

2. A coil winding machine for placing wiring as coils into slots of an annular member comprising, an elbow-shaped winding head portion movable reciprocally in a to and fro single line path and a base portion, one leg of said elbow-shaped portion rotatably carrying a continuous chain and a snorkel member centrally thereof, another leg of said head portion movably connecting said winding head portion to said base portion relative to a slotted annular member connectable to said base portion at a location where said member straddles said one leg and is operatively associated with said continuous chain, base-mounted drive means for said chain operatively coupled to said chain at all times, indexing means carried by said base operable to position the slotted annular member in wire winding association with said chain for an automatically controlled winding pattern sequence, means for feeding a wire to the chain, and means carried on said winding head portion adjacent said chain for guiding the wire from the chain to a slot of the annular member, said snorkel member being movable about its own axis completely relative to said one leg during wire feeding.

3. In a coil winding machine including a support for an annular slotted structure, a winding head movable relative to the slotted structure, comprising an elbow-shaped assembly formed of arm segments extending normal to each other from joined ends, a chain in a closed loop movable longitudinally on one arm segment, a wire-guiding shoe complementary to a pair of slots of the annular structure located in spaced relationship at one side of said looped chain, a freely rotatable snorkel member opposite ends of which are attached to said shoe and said one arm segment, said snorkel member having a longitudinally extending central passage through which a wire is fed, a wire-carrying eyelet attached to said chain movable thereby about said wire-guiding shoe placing wire passed through said snorkel member into selected slots as a coil winding, and a driving means operatively associated with said chain including a movable connection maintaining driving engagement during movement of said winding head relative to the slotted structure, said one arm segment carrying said chain and being movable by another arm segment relative to the support.

4. In a coil winding machine including a support for an annular slotted structure, a winding head movable relative to the slotted structure, comprising, an elbow-shaped assembly formed of arm segments, said head being movable relative to the annular slotted structure into positions coordinated with indexed locations of pairs of slots of the annular structure, coordinating means on said support for programming operational movement of said winding head and indexing movement of the annular slotted structure, a wire-guiding means having a plurality of keys extending therefrom engageable with a complementary plurality of slots of the annular structure, a contoured portion on opposite ends of said wire-guiding means to form wire coils wound flat along transverse ends between slots of the annular structure, a snorkel member freely and rotatably connected at opposite ends between said shoe and one segment of said winding head, said snorkel member having a longitudinal central passage through which a wire is fed, a chain in a closed loop movable longitudinally on said one segment of said winding head, an eyelet means with said chain placing the wire from said snorkel member around said wire-guiding means, driving means controlled to operate by said coordinating means for sequentially operating said chain in placing wire in various predetermined pairs of slots of the annular structure and connected for moving said winding head into operative relationship for placing wire in the slots after moving the annular structure to desired slot positioning.

5. The machine of claim 4 wherein said rotatable snorkel member is located in said arm segment of said winding head in a central position transverse to the plane of said chain in an axis symmetrical within the closed loop about which said chain is movable.

6. An apparatus for winding coils in an annular structure, slotted radially inwardly, comprising, in combination, a chain carrying member adapted to be movable reciprocally in a to and fro linear path relative to the annular structure, support means for the annular structure independent of said chain-carrying member, indexing mechanism operably attached to said support means capable of aligning various sequences of pairs of slots with said chain-carrying member, a continuous chain connected at all times in a power-driven condition and movably carried by said member, driving means always operatively associated with said chain for effecting movement thereof resulting in placing a wire in the aligned pairs of slots, means for positively retaining the wire previously placed in slots as coils in proper place with the annular structure operatively connected through said indexing mechanism and driving means, and means including a snorkel portion disposed centrally relative to said chain for sequentially effecting feeding of wire as coils to the annular structure operatively connected with said driving means and said indexing mechanism, said snorkel portion having a journalled connection relative to said chain carrying member whereby said snorkel portion can rotate 360° entirely about its own longitudinal axis.

7. An apparatus for winding coils in an annular structure slotted radially inwardly, comprising, in combination, a chain carrying member adapted to be movable relative to the annular structure, support means for the annular structure on which said member is also movable including an indexing mechanism capable of aligning various sequences of pairs of slots with said chain-carrying member, a continuous chain movably carried by said member, driving means operatively associated with said chain for effecting movement thereof resulting in placing a wire in the aligned pairs of slots, coordinating means on said support for programming operational movement of said winding head and indexing movement of the annular slotted structure for placing wire as coils in the slots, a wire-guiding means having a plurality of keys extending therefrom engageable with a complementary plurality of slots of the annular structure, a contoured portion on opposite ends of said wire-guiding means to form wire coils, coil hooking means on said support operable to move into spaced relationship with said contoured portions of said wire-guiding means and cooperable therewith in forming flat pancake coils transversely between slots at opposite sides of the slotted annular member while holding previously wound coils out of engagement with the wire being placed, an eyelet means attached to said chain for placing wire in the slots and between said hooking means and wire guiding means, pole hooking means on said support operable to move into engagement with completed coils keeping placed wire taut during movement of said winding head and indexing movement of the slotted structure, and clam shells operable through said indexing mechanism on said support into slot closing location with the slotted annular structure during indexing movement thereof.

8. An apparatus for winding coils in an annular structure slotted radially inwardly, comprising, in combination, a base portion and a winding head portion, means carried by said base portion for positioning a slotted annular member having insulating means protruding from each slot adjacent to sides of said member positioned relative to said winding head portion in rotatably indexed locations, means attached between said base portion and said head portion and operable to move said winding head portion into operative relation with the slotted annular member, a continuous chain rotatably disposed on one side of said winding head portion, means including a snorkel member carried by said winding head portion centrally relative to said chain for feeding a wire to said chain, means for guiding the wire from the chain to a slot of the annular member, and insulation support means on said base portion operable to move adjacent to sides of said annular member and into engagement with the protruding insulating means of the slots into which wire is being placed by the apparatus for protecting the insulating means against damage by the wire during winding of coils.

9. A coil winding machine comprising, a base, a winding head means movable reciprocally in a non-rotatable path on said base transversely to a longitudinal axis of a slotted annular structure supported in rotatably indexed locations on said base, a chain in a closed loop adapted for placing wire in slots as coils movably extending longitudinally adjacent a pair of slots of the annular structure on one side of said winding head means, coordinating means on said support for programming operational movement of said winding head chain and indexing movement of the annular slotted structure, a wire-guiding means extending in spaced relation to said chain from said winding head means engageable by movement of said head means with the slotted annular structure, a snorkel member journalled directly to both said reciprocable winding head means and said wire guiding means as connection therebetween as well as to permit complete rotation of said snorkel member about its own axis and to maintain predetermined spacing between said reciprocable winding head means and said wire guiding means, and motor means for driving said chain always connected with said coordinating means to sequentially move and stop said chain in a looping pattern developing a multi-pole dynamoelectric winding, said chain being movable in clockwise and counterclockwise directions and stopping selectively on opposite sides of the annular slotted structure for sequentially winding wire as coils in opposite directions, said snorkel member having a location centrally inside said chain loop and adapted to cooperate in 360° movement about its own axis in either of reverse direc tions.

10. A coil winding machine comprising, a base capable of supporting a slotted annular structure in rotatably indexed locations about a longitudinal axis thereof, a track provided by said base, a winding head means movable on said track transversely to the longitudinal axis of the slotted annular structure, a longitudinal support member formed with said winding head means extending through a central open space of the annular structure, a closed-loop chain movably disposed on said support member and shiftable by movement of said head means along said track into operative relationship for placing wire in a pair of slots, a pair of sprockets rotatably journalled in said support member and having teeth engagable with looped ends of said chain, a driving means connected to one of said sprockets, a motor means on said base for moving said chain for placing wire in the slots, and a splined connection between said motor means and said driving means maintaining operative relationship therebetween during movement of said winding head means on said track.

11. A coil winding machine comprising, a base capable of supporting a slotted annular structure in rotatably indexed locations about a longitudinal axis thereof, a track provided relative to said base, a winding head means movable on said track transversely to the longitudinal axis of the slotted annular structure, a longitudinal support member formed with said winding head means extending through a central open space of the annular structure, a first closed-loop chain movably disposed on said support member and shiftable by movement of said head means along said track into operative relationship for placing a wire in a pair of slots, a first pair of sprockets rotatably journalled in said support member and having teeth engageable with looped ends of said first chain, a second pair of sprockets rotatably journalled with said support member, a shaft interconnecting one sprocket of each of said first and second pair of sprockets, a second chain carried in a closed loop about said second pair of sprockets, a motor means on said base for moving said second chain effecting driving of said first chain for placing wire in the slots, and a splined connection between said motor means and one of the sprockets for said second chain maintaining operative relationship therebetween during movement of said winding head means on said track.

12. A coil winding machine comprising, a base capable of supporting a slotted annular structure with insulating means protruding from each slot in rotatably indexed locations, about a longitudinal axis thereof, a track carried by said base, a winding head means movable on said track transversely to the longitudinal axis of the slotted annular structure, a longitudinal support member formed with said winding head means movable on said track transversely to the longitudinal axis of the slotted annular structure, said winding head means extending through a central open space of the annular structure, a closed-loop chain movably disposed on said support member and shiftable by movement of said head means along said track into operative relationship for placing a wire in a pair of slots, indexing mechanism operably attached to said base capable of aligning various sequences of pairs of slots of the annular structure with said longitudinal support member, a closed-loop chain movably carried by said member, driving means operatively associated with said chain for effecting movement thereof, a wire guiding shoe complementary to the selected pair of slots of the annular structure attached to said longitudinal support member in spaced relationship at one side of said looped chain, a freely rotatable snorkel member opposite ends of which are attached to said shoe and said longitudinal support member, said snorkel member having a longitudinally extending central passage through which a wire is fed, a wire-carrying eyelet attached to said chain movable thereby about said wire-guiding shoe placing wire passed through said snorkel member into selected slots as a coil winding, coil hooking means on said base operable to move into spaced relationship with said shoe and cooperable therewith in forming flat pancake coils transversely between slots at opposite sides of the slotted annular member while holding previously wound coils out of engagement with the wire being placed, a pole hooking means on said base operable to move into engagement with completed coils keeping placed wire taut during movement of said winding head means and indexing movement of the slotted structure, clam shells operable through said indexing mechanism on said base into slot closing location with the slotted annular structure during indexing movement thereof, movable finger-shaped cuff supports on said base operable to move into engagement with the insulating means protruding from each slot for protecting the insulating means against damage by the wire during winding of coils, and motor means operably connected with said indexing mechanism and said winding head means to drive said chain sequentially for placing wire as coils in the slotted annular member.

13. A winding head means for use with a coil winding machine having a track means and a support for a slotted annular structure as well as motor means, comprising, in combination, a body portion having an elbow-shaped juncture forming a support portion and track portion extending normal to each other, a closed-loop chain movably disposed on one side of said support portion, a wire placing means in operative relation with said chain and including a wire guiding shoe attached to said support portion in spaced relationship at one side of said chain, said track portion being movable on the track means effecting placement of said shoe relative to the slotted annular member, and drive means including sprockets always engaging said chain operatively connected always with the motor means capable of effecting movement of said chain to place a wire with the slotted annular structure, said elbow-shaped juncture of said body portion having a location fully to one side of said chain adapted to project with said support portion as a cantilever through the slotted annular structure.

14. A winding head means for use with a coil winding machine having a track means and a support for a slotted annular structure as well as motor means, comprising, in combination, a body portion having an elbow-shaped juncture forming a support portion and track portion extending at an angle relative to each other, a first closed-loop chain movably disposed on said support portion, a first pair of sprockets rotatably journalled in said support portion and having teeth engageable with looped ends of said first chain, a second pair of sprockets rotatably journalled with said support portion, means interconnecting one sprocket of each of said first and second pair of sprockets, a second chain carried in a closed loop about said second pair of sprockets, means formed on said track portion complementary to and cooperable with the track means of the winding machine permitting movement of said first chain away from and into operative relation with the slotted annular structure supportable on the machine, and a splined connection between the second sprocket of said second pair of sprockets and the motor means on the machine maintaining driving engagement therebetween at all times.

15. A winding head for a coil winding machine, comprising, in combination, a body portion having an elbow-shaped juncture forming a support element projected as a cantilever through a central opening of a slotted annular member from a track element extending transversely to the longitudinal axis of said support element, a chain in a closed loop mounted longitudinally of and movable about said support element, a wire-guiding shoe complementary to a pair of slots of the annular structure located in spaced relationship at one side of said looped chain, a freely rotatable snorkel member opposite ends of which are attached to said shoe and said support element, said snorkel member having a passage through which a wire is fed, a wire-carrying eyelet attached to said chain movable thereby about said wire-guiding shoe for placing wire passed through said snorkel member into slots as a coil winding, said track element being movable with said support element effecting placement of said wire-guiding shoe relative to the pair of slots, and drive means operatively connected with said chain driving said eyelet.

16. The winding head of claim 15 wherein said wire-guiding shoe includes at least one strut angularly formed relative to said shoe extending therefrom longitudinally thereof to facilitate wire placement into each slot as said wire carrying eyelet is driven by said driving means.

17. A wire-guiding shoe for use with an apparatus for winding coils in an annular structure having a plurality of slots therein extending radially inwardly, comprising, an intermediate member engageable through a central opening of said annular structure into cooperative relationship with the structure slotted radially inwardly, and legs in groups on opposite ends of said intermediate member, each group of said legs including an intermediate portion formed to extend longitudinally beyond ends of slots so as to guide wire toward the bottom of the slot, and side portions located toward opposite lateral directions on each side of said intermediate portion so as to supplement said intermediate portion in guiding of wire both in the direction of the slots generally as well as specifically more to the top of pairs of slots on opposite sides of said annular structure, said legs including struts for urging and guiding wire into the slot in spite of wire build up in the winding slot.

18. A wire guiding shoe means for use on an apparatus for winding wire coils in an annular structure having slots with insulation therein, comprising, an intermediate member having splines along one side adapted to engage the slotted structure, winding shoe segments adapted to be attached to opposite ends of said member and each including a mounting platform portion, a plurality of struts joined to each other at one end and joined to said platform portion at an opposite end, said struts at least in part being contoured to have an arcuate portion over which wire for winding the coils is forced into a path covering a pair of slots spaced from each other in the annular structure, and leg means extending downwardly from said platform portion and located adjacent to a slot in which wire is placed in the path, said leg means providing a final guide for placement of wire into slots such that wire is hindered from being placed intermediate to the insulation and side wall of a slot but rather is urged to a position within the slot to fill the same relative to the insulation.

References Cited in the file of this patent

UNITED STATES PATENTS

| | | |
|---|---|---|
| 1,407,033 | Huggins | Feb. 21, 1922 |
| 2,738,136 | Bugg | Mar. 13, 1956 |
| 2,770,424 | Grove | Nov. 13, 1956 |
| 2,835,453 | Young | May 20, 1958 |

FOREIGN PATENTS

| | | |
|---|---|---|
| 152,366 | Switzerland | Apr. 16, 1932 |
| 718,295 | Germany | Mar. 9, 1942 |